(12) United States Patent
Bathiche et al.

(10) Patent No.: US 9,014,685 B2
(45) Date of Patent: Apr. 21, 2015

(54) MOBILE DEVICE WHICH AUTOMATICALLY DETERMINES OPERATING MODE

(75) Inventors: Steven N. Bathiche, Kirkland, WA (US); William J. Westerinen, Issaquah, WA (US); Miller T. Abel, Mercer Island, WA (US); Julio Estrada, Medina, WA (US); Charles J. Migos, San Bruno, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 700 days.

(21) Appl. No.: 12/483,483

(22) Filed: Jun. 12, 2009

(65) Prior Publication Data

US 2010/0317332 A1 Dec. 16, 2010

(51) Int. Cl.
*H04M 3/00* (2006.01)
*H04B 1/38* (2006.01)
(Continued)

(52) U.S. Cl.
CPC .......... *H04B 1/202* (2013.01); *G08C 2201/20* (2013.01); *H04M 2201/38* (2013.01);
(Continued)

(58) Field of Classification Search
CPC .......... G06K 9/00456; G06K 9/00463; G06K 9/00664; G06K 9/00711; G06K 9/00624; G06K 9/344; G03B 17/18; G03B 13/20; G06T 7/0044; G06T 7/0046; H04N 21/4126; H04N 21/42204; H04N 21/4223
USPC .............. 455/41.2, 556.1, 418, 419, 420; 348/14.03, 14.04, 14.05, 114, 119, 348/175, 176, 177, 178, 552, 211.99, 211.1, 348/211.2, 734; 382/100, 104, 312, 313; 725/37, 60, 61, 80, 115, 117, 139, 140, 725/141; 340/4.1, 4.11, 10.5, 10.51, 10.52, 340/4.3, 4.31, 4.32; 379/102.01, 102.02, 379/102.03; 345/2.3, 158
See application file for complete search history.

(56) References Cited

U.S. PATENT DOCUMENTS 5,724,106 A * 3/1998 Autry et al. .................... 348/734
6,711,293 B1 3/2004 Lowe
(Continued)

FOREIGN PATENT DOCUMENTS

CN 101193225 A 6/2008
EP 1841189 10/2007
(Continued)

OTHER PUBLICATIONS

David G. Lowe, Object Recognition from Local Scale-Invariant Features, Sep. 1999, Proceeding of the International Conference on Computer Vision.*
(Continued)

*Primary Examiner* — George Eng
*Assistant Examiner* — Hung Du
(74) *Attorney, Agent, or Firm* — Heikki Einola; Judy Yee; Micky Minhas

(57) ABSTRACT

A mobile device such as a cell phone is used to remotely control an electronic appliance such as a television or personal computer. In a setup phase, the mobile device captures an image of the electronic appliance and identifies and stores scale-invariant features of the image. A user interface configuration such as a virtual keypad configuration, and a communication protocol, can be associated with the stored data. Subsequently, in an implementation phase, another image of the electronic appliance is captured and compared to the stored features in a library to identify a match. In response, the associated user interface configuration and communication protocol are implemented to control the electronic appliance. In a polling and reply process, the mobile device captures a picture of a display of the electronic device and compares it to image data which is transmitted by the electronic appliance.

6 Claims, 16 Drawing Sheets

(51) Int. Cl.
*H04M 1/00* (2006.01)
*H04B 1/20* (2006.01)
*H04L 12/28* (2006.01)
*H04N 5/44* (2011.01)
*H04N 21/422* (2011.01)
*H04N 21/436* (2011.01)
*H04N 21/4363* (2011.01)
*H04N 21/478* (2011.01)
*H04N 21/658* (2011.01)
*H04N 21/81* (2011.01)

(52) U.S. Cl.
CPC ... H04M2203/1016 (2013.01); H04M 2207/18 (2013.01); *H04L 12/282* (2013.01); *H04N 5/4403* (2013.01); H04L 2012/2841 (2013.01); H04L 2012/2849 (2013.01); H04N 2005/4425 (2013.01); H04N 2005/4428 (2013.01); H04N 2005/4439 (2013.01); *H04N 21/42207* (2013.01); H04N 21/42208 (2013.01); *H04N 21/4222* (2013.01); *H04N 21/42222* (2013.01); H04N 21/42227 (2013.01); *H04N 21/43615* (2013.01); *H04N 21/43637* (2013.01); H04N 21/478 (2013.01); H04N 21/6581 (2013.01); H04N 21/8186 (2013.01); H04N 2005/4408 (2013.01)

(56) References Cited

U.S. PATENT DOCUMENTS

| | | | |
|---|---|---|---|
| 6,738,631 | B1 | 5/2004 | Adler et al. |
| 7,138,979 | B2 | 11/2006 | Robin |
| 7,224,903 | B2 * | 5/2007 | Colmenarez et al. ......... 398/106 |
| 7,653,212 | B2 * | 1/2010 | Haughawout et al. ........ 382/100 |
| 8,238,612 | B2 * | 8/2012 | Susca et al. .................. 382/107 |
| 8,356,035 | B1 * | 1/2013 | Baluja et al. ................. 707/741 |
| 2003/0085870 | A1 | 5/2003 | Hinckley |
| 2003/0148775 | A1 | 8/2003 | Spriestersbach |
| 2004/0056789 | A1 * | 3/2004 | Arling et al. ................. 341/176 |
| 2004/0095317 | A1 | 5/2004 | Zhang |
| 2004/0208588 | A1 | 10/2004 | Colmenarez et al. |
| 2004/0259536 | A1 | 12/2004 | Keskar |
| 2005/0286888 | A1 * | 12/2005 | Konttinen .................... 396/374 |
| 2006/0017692 | A1 | 1/2006 | Wehrenberg |
| 2006/0064276 | A1 | 3/2006 | Ren |
| 2006/0148518 | A1 | 7/2006 | Ferris |
| 2006/0204232 | A1 * | 9/2006 | Weinberg et al. ............... 396/50 |
| 2007/0013775 | A1 * | 1/2007 | Shin ............................. 348/114 |
| 2007/0022380 | A1 | 1/2007 | Swartz |
| 2007/0052547 | A1 * | 3/2007 | Haughawout et al. ... 340/825.22 |
| 2007/0097275 | A1 * | 5/2007 | Dresti et al. .................. 348/734 |
| 2007/0124372 | A1 | 5/2007 | Liu et al. |
| 2007/0150078 | A1 * | 6/2007 | Tanabe et al. ................... 700/33 |
| 2007/0220427 | A1 | 9/2007 | Briancon |
| 2007/0236327 | A1 * | 10/2007 | Miyashita et al. ........... 340/3.71 |
| 2007/0279244 | A1 | 12/2007 | Haughawout |
| 2008/0003993 | A1 | 1/2008 | Rye |
| 2008/0009310 | A1 | 1/2008 | Rhoads |
| 2008/0014917 | A1 | 1/2008 | Rhoads |
| 2008/0059888 | A1 | 3/2008 | Dunko |
| 2008/0125102 | A1 | 5/2008 | Abel |
| 2008/0155429 | A1 | 6/2008 | Frank |
| 2008/0214146 | A1 * | 9/2008 | Lincoln et al. ............. 455/412.1 |
| 2008/0299905 | A1 * | 12/2008 | Kumar .......................... 455/41.2 |
| 2008/0314165 | A1 | 12/2008 | Rosenberg |
| 2009/0011832 | A1 | 1/2009 | Rofougaran |
| 2009/0051648 | A1 | 2/2009 | Shamaie |
| 2009/0100474 | A1 | 4/2009 | Migos |
| 2010/0054596 | A1 * | 3/2010 | Yun, II ......................... 382/173 |
| 2010/0079374 | A1 * | 4/2010 | Cortenraad et al. .......... 345/158 |
| 2010/0260426 | A1 * | 10/2010 | Huang et al. ................. 382/218 |

FOREIGN PATENT DOCUMENTS

| | | | | |
|---|---|---|---|---|
| WO | WO 2004047011 | A2 * | 6/2004 | ............ G06K 11/00 |
| WO | WO 2005043484 | A1 * | 5/2005 | |
| WO | WO2010/144532 | A2 | 12/2010 | |

OTHER PUBLICATIONS

Blackberry Thunder 9500 Mobile Phone, Sep. 29, 2008, http://www.mobilephonereviews.org/blackberry/blackberry-thunder-9500-mobile-phone/.

Apple iPhone 3G Mobile Phone, Apr. 21, 2009, http://www.apple.com/iphone/features/sensors.html.

Apple iPhone, Accelerometer, Apr. 21, 2009, http://www.apple.com/iphone/features/accelerometer.html.

Samsung Memoir T929—black (T-Mobile), CNET Editor's Review, Feb. 25, 2009, http://reviews.cnet.com/cell-phones/samsung-memoir-t929-black/4505-6454_7-33516609.html.

Dachselt, "Natural Throw and Tilt Interaction between Mobile Phones and Distant Displays," Apr. 9, 2004, http://isgwww.cs.uni-magdeburg.de/cvse/Forschung/Publikationen/2009-CHI-Throw+Tilt.pdf.

Lowe, "Object Recognition from Local Scale-Invariant Features," Proc. of the International Conference on Computer Vision, Corfu, Sep. 1999.

Rosenberg, "IMPAD—An Inexpensive Multi-Touch Pressure Acquisition Device," CHI 2009, Boston Massachusetts, USA, Apr. 4-9, 2009.

Siewiorek, "SenSay: A Context-Aware Mobile Phone," Human Computer Interaction and Institute for Complex Engineered Systems, Carnegie Mellon University, Sep. 30, 2003.

International Search Report & The Written Opinion of the International Searching Authority dated Jan. 24, 2011, International Patent Application No. PCT/US2010/037903.

Response to Office Action dated Sep. 24, 2014, European Patent Application No. 10786745.9.

European Examination Report dated Jul. 29, 2014, European Patent Application No. 10786745.9.

* cited by examiner

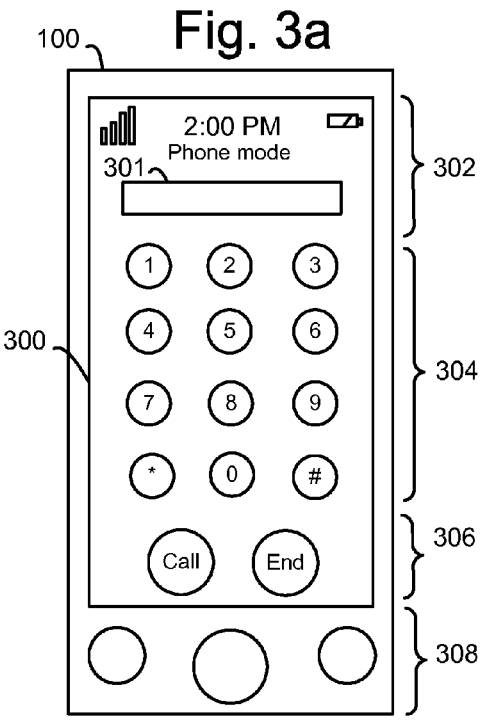
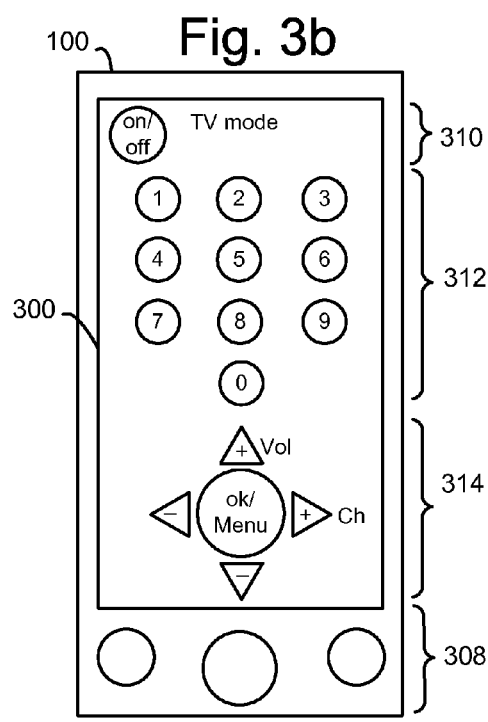
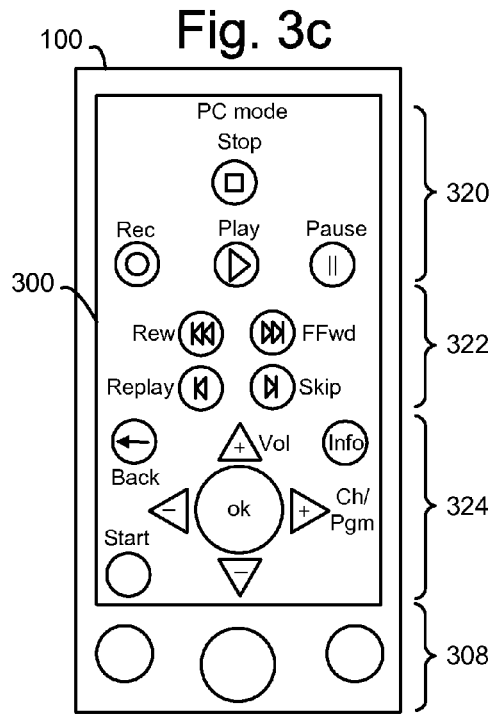
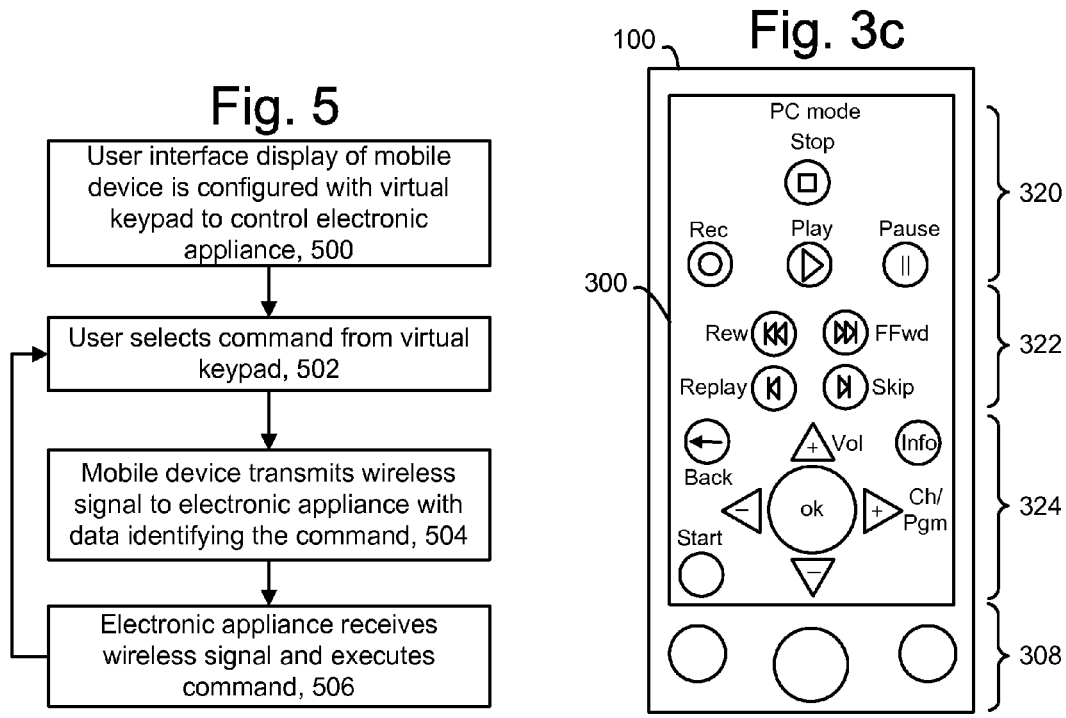

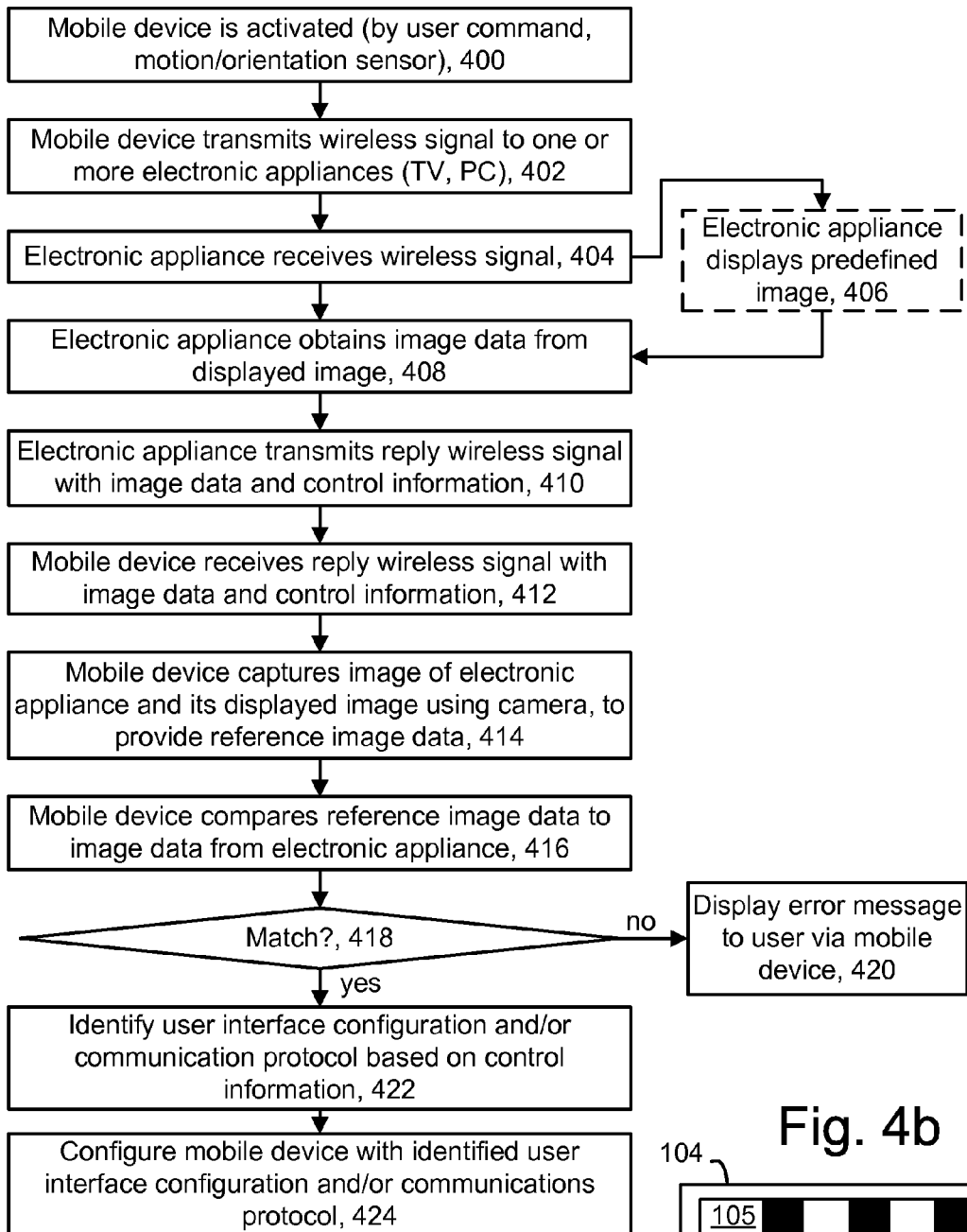
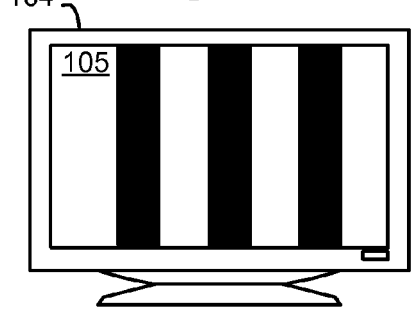

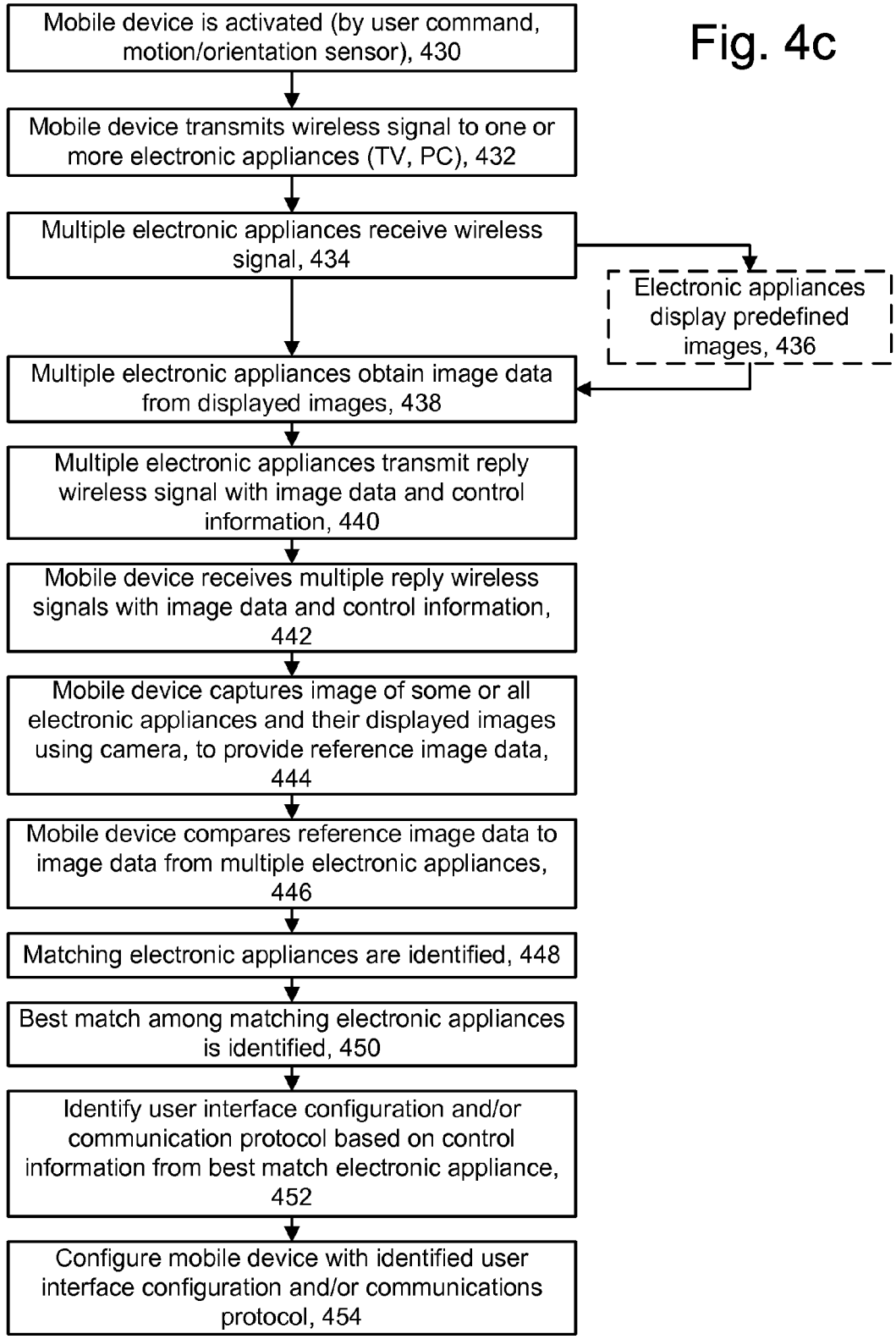

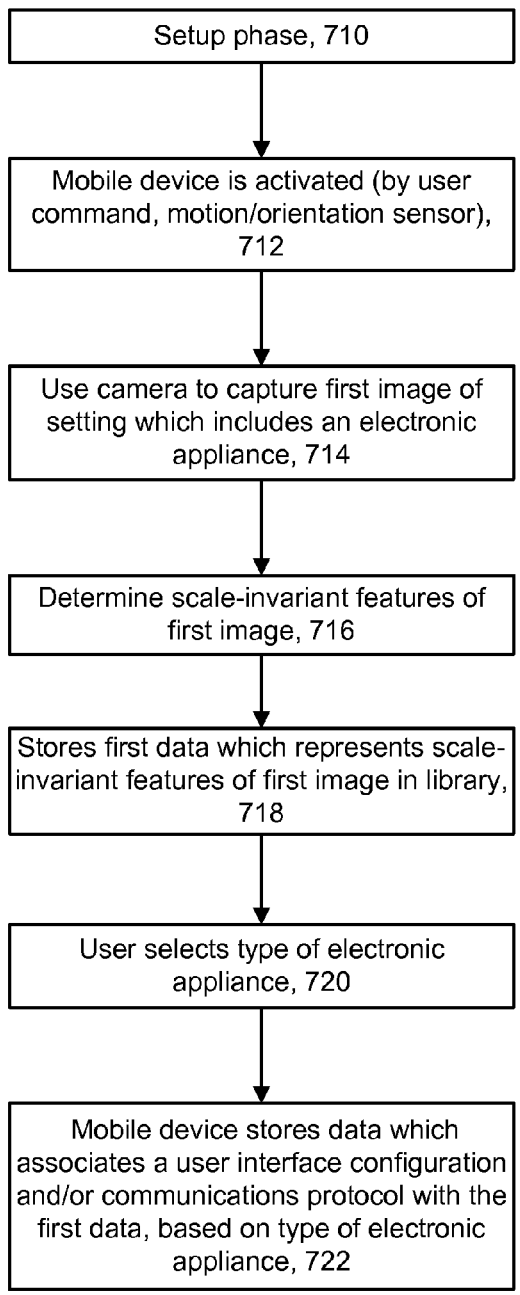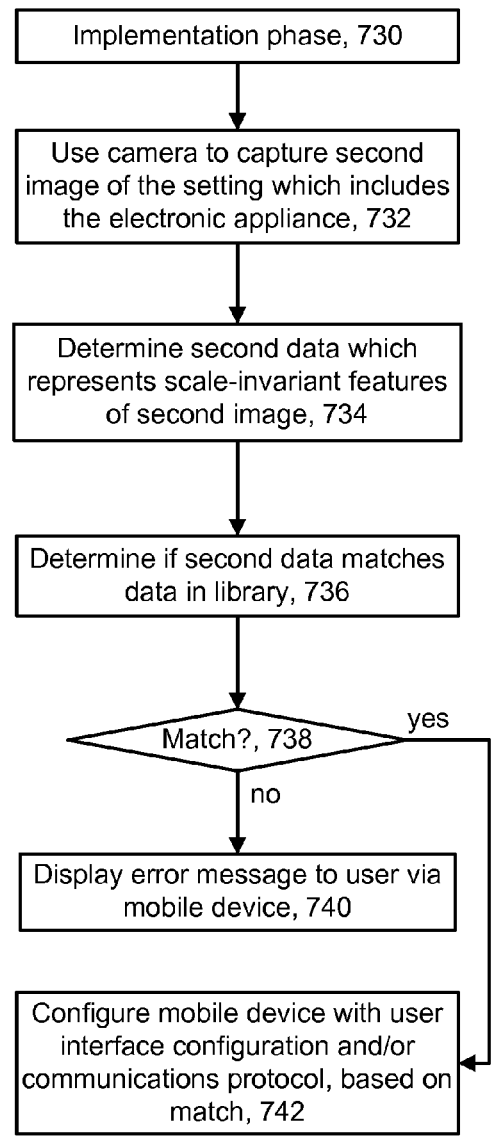

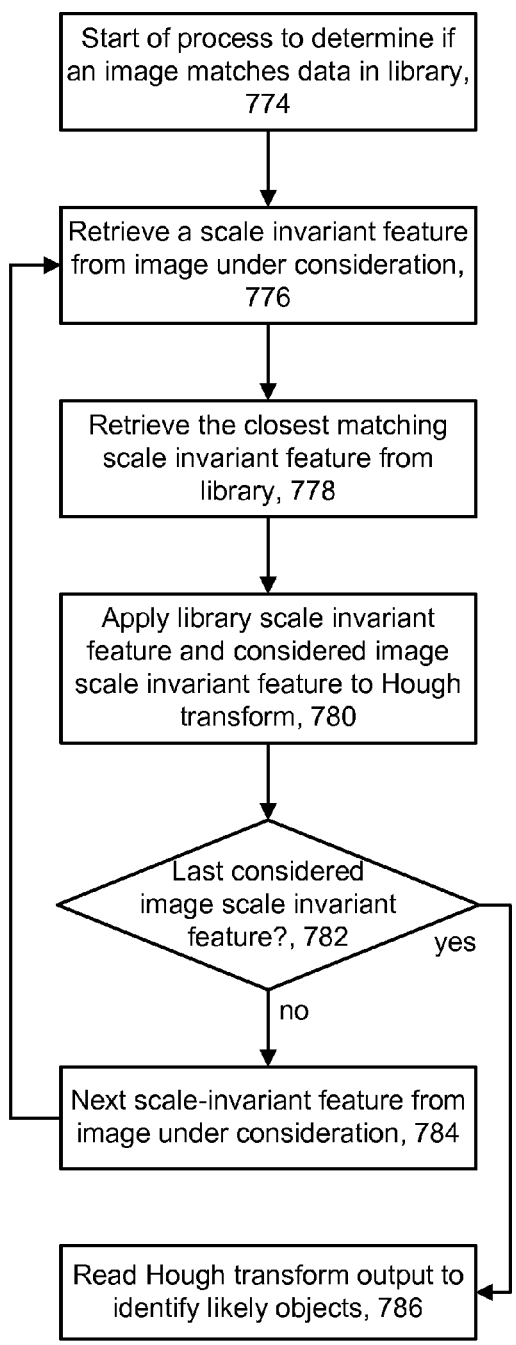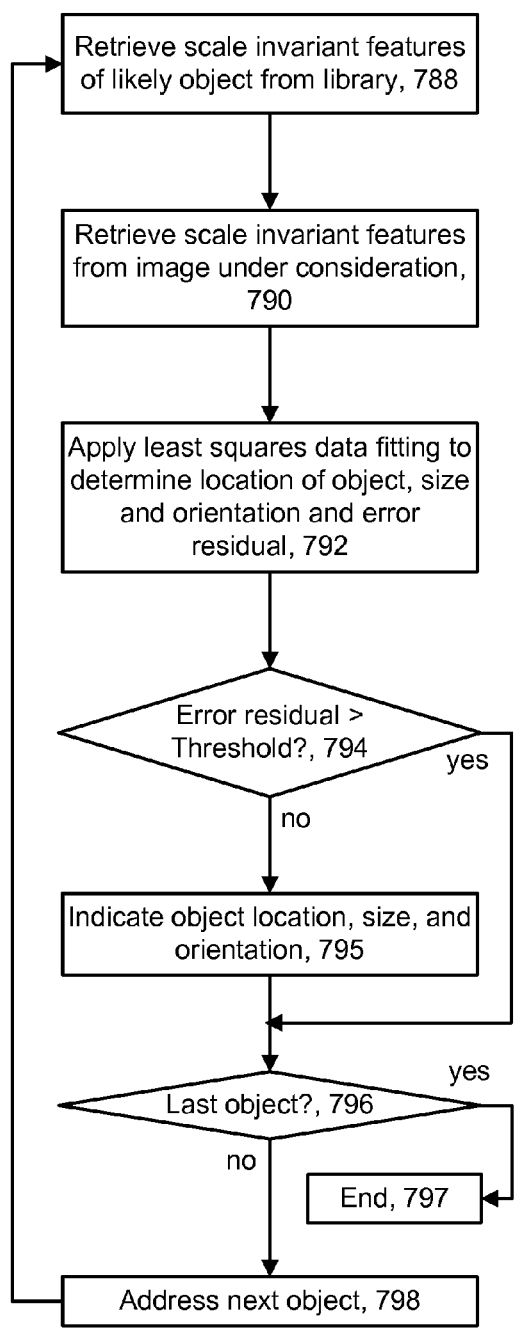

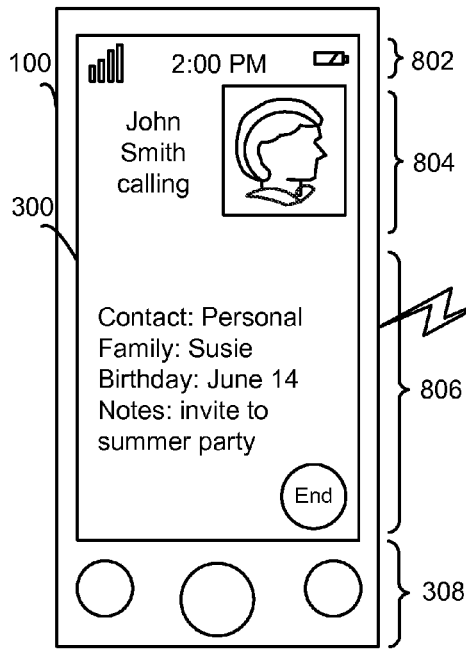
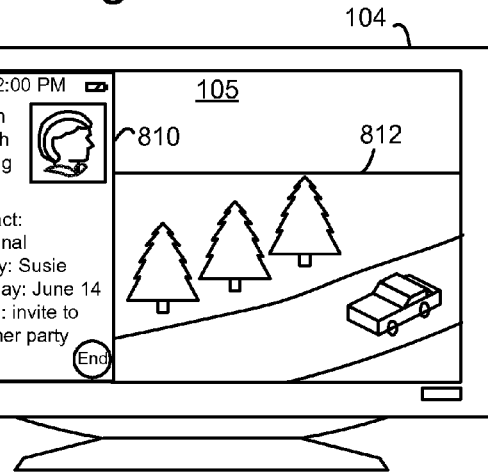
Fig. 8a
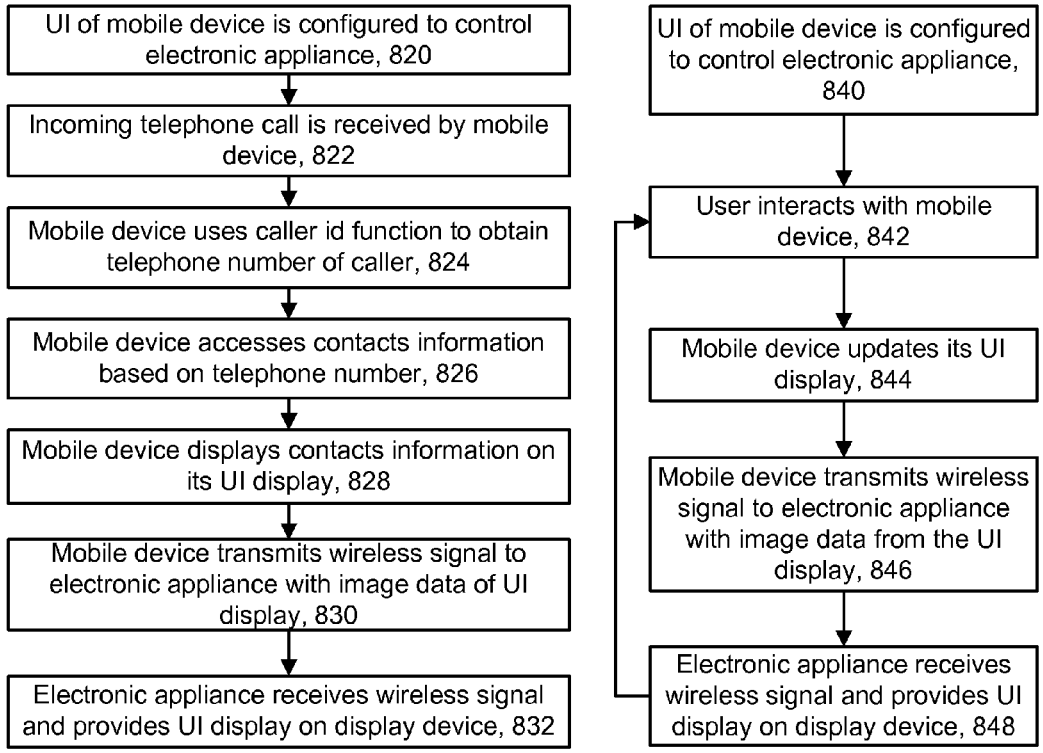
Fig. 8b
Fig. 8c

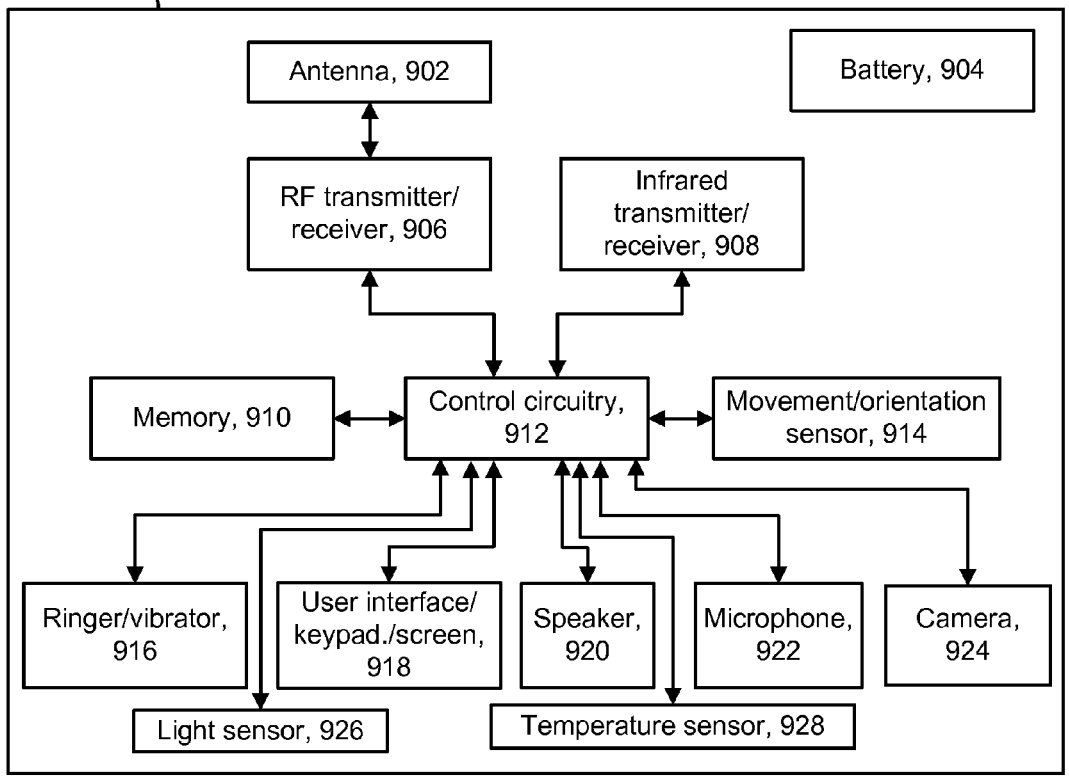
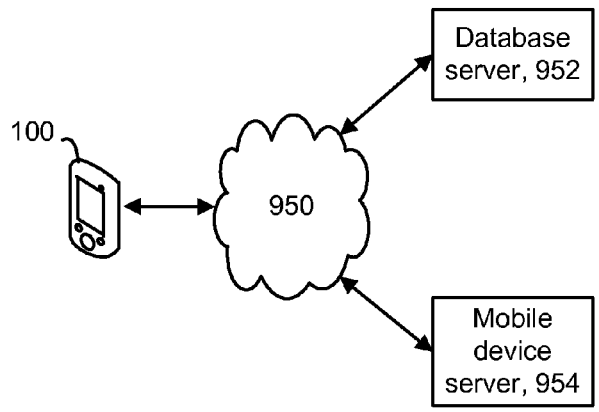

US 9,014,685 B2

MOBILE DEVICE WHICH AUTOMATICALLY DETERMINES OPERATING MODE

BACKGROUND

Mobile communication devices such as cellular telephones have become omnipresent in society. Voice communications and other data communications such as web browsing can be provided via a cellular telephone network such as the Global System for Mobile communication (GSM) network. Moreover, mobile devices typically have a number of built in components for other applications. For example, built in cameras enable still and video images to be captured. Infrared transmitters can be used to transfer data to/from a personal digital assistant (PDA), laptop or point-of-sale terminal. RF transmitters and receivers allow wireless communications over wireless local area networks (WLANs) such as Wi-Fi networks and over personal local area networks, such as Bluetooth networks. Moreover, applications have recently been developed which allow a mobile device to act as a hand held remote control for a television or video game console. Thus, a mobile device can operate in a variety of modes. However, the user has the burden of configuring the mobile device to recognize its current context and operate in the appropriate mode.

SUMMARY

A mobile device which communicates by wireless signals is provided, where the mobile device automatically determines an operating mode by visually sensing its environment, in addition to a processor-implemented method for configuring such a mobile device. The mobile device may be a hand-held mobile device such as a cell phone, web-enabled smart phone, personal digital assistant, palmtop computer, laptop computer or similar device which communicates by wireless signals. The mobile device can be used to control an electronic appliance such as a television or personal computer (PC) using a camera in the mobile device. In particular, a user can enter a setup mode in the mobile device in which an image of an electronic appliance and a surrounding area is captured and stored. The mobile device associates the image with a user interface configuration and/or a communication protocol for controlling the electronic appliance. For example, the user interface configuration may be an arrangement of soft keys in a user interface screen of the mobile device, and the communication protocol may include commands which the mobile device sends to the electronic appliance to control it, such as by selecting content to be displayed on the electronic appliance.

Once the mobile device is setup, it can automatically configure itself when the user again desires to control the electronic appliance at a later time. The camera can be activated to capture an image of the surrounding area and process the image to determine if it matches the previously-stored image data. The activation can be automatic based on physical sensors which indicate the mobile device is in a picture taking orientation. If the mobile device recognizes that it is in the same surroundings as before, it automatically configures itself to control the electronic appliance which was associated with the surroundings. It is also possible for the mobile device to obtain information for controlling the electronic appliance from the electronic appliance itself in a polling and reply process.

In one embodiment, a hand-held mobile device includes an image sensor, a user interface (UI), a memory which stores processor-readable code, and a processor which executes the processor-readable code. The processor configures the mobile device to control an electronic appliance. Specifically, the processor captures a first image of the electronic appliance using the image sensor at a first time, stores first data in the memory based on the first image, and captures a second image of the electronic appliance using the image sensor at a second time. The processor also provides second data based on the second image, determines if the first data matches the second data, and if the first data matches the second data, configures the user interface for use with the electronic appliance.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 3a depicts a mobile device with a touch screen user interface configured for use as a cell phone.

FIG. 3b depicts a mobile device with a touch screen user interface configured for use as a TV remote control.

FIG. 3c depicts a mobile device with a touch screen user interface configured for use as a personal computer (PC) remote control.

FIG. 4a depicts a method in which a mobile device automatically configures itself for use with an electronic appliance by comparing a mobile device-captured image of the electronic appliance with image data transmitted by the electronic appliance.

FIG. 4b depicts a predefined image which is displayed on a display device of an electronic appliance in response to receipt of a wireless signal from a mobile device.

FIG. 4c depicts a method in which a mobile device automatically configures itself for use with an electronic appliance by comparing a mobile device-captured image of multiple electronic appliances with image data transmitted by the electronic appliances, and selecting a best match among the multiple electronic appliances.

FIG. 5 depicts a method in which a mobile device controls an electronic appliance after a user interface of the mobile device is configured for use with the electronic appliance.

FIG. 7b depicts a setup phase of a method in which a mobile device automatically configures itself for use with an electronic appliance by capturing an image of a setting which includes the electronic appliance and comparing the image to a previously-captured image of the setting taken from a different perspective and distance.

FIG. 7c depicts an implementation phase which follows the setup phase of the method of FIG. 7b.

FIG. 7f depicts a first part of a process for matching images based on scale-invariant features.

FIG. 7g depicts a second part of a process for matching images based on scale-invariant features.

FIG. 8a depicts an electronic appliance displaying information to mirror a user interface of a mobile device, after the mobile device is automatically configured for use with the electronic appliance.

FIG. 8b depicts a method in which an electronic appliance displays contacts information of a caller to a mobile device, after the mobile device is automatically configured for use with the electronic appliance.

FIG. 8c depicts a method in which an electronic appliance mirrors a user interface of a mobile device, after the mobile device is automatically configured for use with the electronic appliance.

FIG. 9a depicts an example block diagram of a mobile device.

FIG. 9b depicts an example mobile device network.

DETAILED DESCRIPTION

Figure 1A:
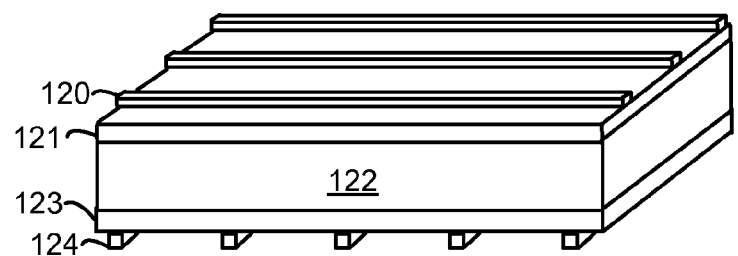
FIG. 1a depicts a touch-sensitive skin of a mobile device.

A mobile device which communicates by wireless signals is provided, where the mobile device automatically determines an operating mode by visually sensing its environment, in addition to a processor-implemented method for configuring such a mobile device. Conventionally, the user has the burden of configuring a mobile device to operate in a specific mode. The configuring process can be time-consuming and difficult, and, in many cases, beyond the user's capabilities. Further, there is a burden of repeatedly changing the configuration when the mobile device needs to switch between different modes. For example, the user may desire to operate a mobile device as a remote control of a television. This might be achieved by the user pressing a sequence of keys on the mobile device which launches an appropriate television remote control application. If the user then desires to operate the mobile device as a remote control of a PC, it is necessary to press another sequence of keys on the mobile device which launches an appropriate PC remote control application. Furthermore, in either case, there may be an additional setup requirement in which the user presses a sequence of keys on the mobile device to identify the television model, PC model, operating system and applications running on the PC.

In some cases, the television and PC are connected such that the PC provides video signals to the television. The mobile device must be switched to the TV mode to, e.g., control the television to adjust audio and color settings which are implemented by hardware of the television, and to the PC mode to, e.g., control the PC to run a media center application which plays a video such as a movie, or displays a web page, or digital photographs in a photo editing application, on the television. Such cases can also require that the mobile device be switched back and forth between different control modes. Extensive manual negotiation of the keys or other control inputs of the mobile device is required.

It would therefore be desirable to provide a technique in which a mobile device automatically recognizes an electronic appliance which the user desires to control, and to configure itself for that context, such as by configuring user interface settings to control the electronic appliance.

The techniques provided herein involve context recognition. Context recognition has many different aspects. Generally, physical sensors in a mobile device can be used to determine various type of information. For example, the orientation of a mobile device can be determined so that the user interface (UI) display of the mobile device is oriented vertically or horizontally for greatest ease of use. Other sensors can determine the location of the mobile device and modify a configuration of the mobile device to suit the location. For example, a mobile device could determine if it is at a user's home or work place and change it settings and functionality. For example, if location sensors (e.g., GPS, GSM and/or Wi-Fi network sensors) indicate that the mobile device is at a user's home, or even in a specific room of the home such as the living room, the mobile device could change its functions to become a TV remote control when it is picked up. The mobile device could also have active infrared sensors that detect infrared signals from a game console which cause the mobile device to automatically go into "game mode" to play video games on a television. The mobile device could remain in that mode until it receives an incoming phone call and then switch back to a phone mode again. Similarly, if the mobile device is picked up outside the home, it may change functions and enter a phone mode. The user should also have the ability to manually change the mobile device's functions to switch between different modes, such as phone, TV remote and game controller modes.

A mobile device can have intention based mode switching that causes it to change modes based on sensor inputs. For example, a mobile device may act as a cell phone that rings when an incoming call is received, and automatically stops ringing when it is picked up, based on a determination by a motion sensor. As another example, if the mobile device was picked up in an idle state, when there is no incoming call, it could determine that the user intends to place a phone call and immediately go into a call mode. In another approach, a mobile device has sensors such as a number of discrete sensors on a periphery or other locations of the mobile device, or a touch sensitive skin across the sides and back of the mobile device which can provide a capacitive image of the entire portion of the hand that touches the mobile device. A touch sensitive skin allows the mobile device to sense the way it is being gripped, such as to determine if it is picked up by the right hand versus the left hand, and to change characteristics such as the display orientation and/or the method of placing a phone call accordingly. A touch-sensitive skin could also be used to determine if the user is holding the mobile device in a picture-taking orientation, and to take a corresponding action as described herein. See FIG. 1a, below.

Generally, the mobile device can determine when a user has performed a non-functinal interaction with the mobile device, or an intended use interaction. A non-functional interaction is an interaction which does not involve using functions which are designed into the mobile device. An example is picking the mobile device up from a table. In contrast, an intended use interaction occurs when the user interacts with the mobile device to use its functions. An example is holding the mobile device in a picture-taking orientation, to use the mobile device's camera to take a picture. Another example is holding the mobile device up to the ear to talk on the phone. These interactions can be detected, e.g., by interpreting the grip the user has placed on the mobile device, using touch/grip sensors around the mobile device, in addition to use of other sensors such as a light sensor, proximity sensor and/or accelerometer. For instance, when the mobile device is held up to the user' ear, a grip sensor may sense a corresponding grip, a light sensor may sense a decrease in light, a proximity sensor may sense the proximity of the user's head, and the accelerometer may sense a corresponding orientation. Thus, the mobile device can use appropriate sensors to detect that it is being held, and the way in which it is being held, and to identify and activate a corresponding function of the mobile device.

It is also possible to identify unique characteristics of a particular user's hand based on criteria such as geometry and applied pressure. This information can be used to identify which user is currently using a mobile device and to perform a function such as locking or unlocking the mobile device, or modifying the user interface to use larger numbers and symbols on a UI display for an older user, among many possibilities.

As another example, if the mobile device has a large display with a projected keyboard, it could sense the position of the fingers of the hands and position the projected keyboard to be most convenient for typing by moving the layout to adjust for hand position.

Another possible approach is to have sensors detect if the mobile device is located in a pocket, drawer, purse or other enclosure. This could be done using temperature sensing and/or light sensing. If the mobile device determines it is in an enclosure, it could start to ring and within a short time start changing its ring tone to be louder and/or at different frequencies and to continue this until the user retrieves the mobile device. Light sensors could also be used to detect the ambient light inside a room or outside a building and change the brightness or contrast settings of the user interface display of the mobile device to give the best viewing quality.

FIG. 1a depicts a touch-sensitive skin of a mobile device. Touch sensors may operate by way of resistive, capacitive, surface wave, infrared, strain gauge, optical imaging, dispersive imaging technology, and acoustic pulse recognition techniques. For example, see US patent application publication no. 20070220427, incorporated herein by reference, which describes an adaptive skin covering for an electronic device. See also Rosenberg et al., IMPAD—An Inexpensive Multi-Touch Pressure Acquisition Device, Proceedings of the 27th international Conference on Human Factors in Computing Systems, pp. 3217-3222, Apr. 4-9, 2009, incorporated herein by reference. A touch-sensitive skin of a mobile device, such as described by Rosenberg et al., uses paper-thin, flexible pressure acquisition devices which can easily scale down to fit on a portable device. These devices can sense varying levels of pressure at a resolution high enough to sense and distinguish multiple fingertips, pen or pencil tip, and other objects. An example touch-sensitive skin conceptually has five layers. The first and fifth layers are outer layers which have parallel wires which allow interface with external electronics. An example wire 120 is in the first layer, and an example wire 124 is in the fifth layer. The wires are parallel to one another in a layer, while wires in layer 1 run in a direction perpendicular to the direction of the parallel wires on layer 5. The second layer 121 and the fourth layer 123 include a resistive material which allows a trickle of current between adjacent wires and accounts for the bilinear nature of the device. A third (middle) layer 122 includes a material whose electrical resistance decreases when compressed, allowing for the sensing of outside forces.

During operation, one wire at a time along layer 1 is sourced to a positive voltage while all the others are set to ground. Then, the voltage at each of the wires on layer 5 is measured one at a time as all the other wires on layer 5 are set to ground. This repeats until a voltage reading is taken for each intersection between a row and a column wire. For increased scan speed, it is also possible to read voltages from all the even numbered wires simultaneously followed by all the odd numbered wires. This results in scan rates which grow linearly with the number of wires on the top layer of the sensor.

When external pressure is applied to the sensor, a path is created that allows current to flow from layer 1 to layer 5. The current flows along layer 2, then through the point of contact in layer 3, then along layer four and finally past an electrode in layer 5. The resulting voltage at an intersection depends on the resistance of that current path which depends on the proximity of the contact point from the intersection and the pressure exerted at that point.

Experiments can reveal touch patterns of a touch-sensitive skin of a mobile device which are associated with specific intended use interactions.

Figure 1B:
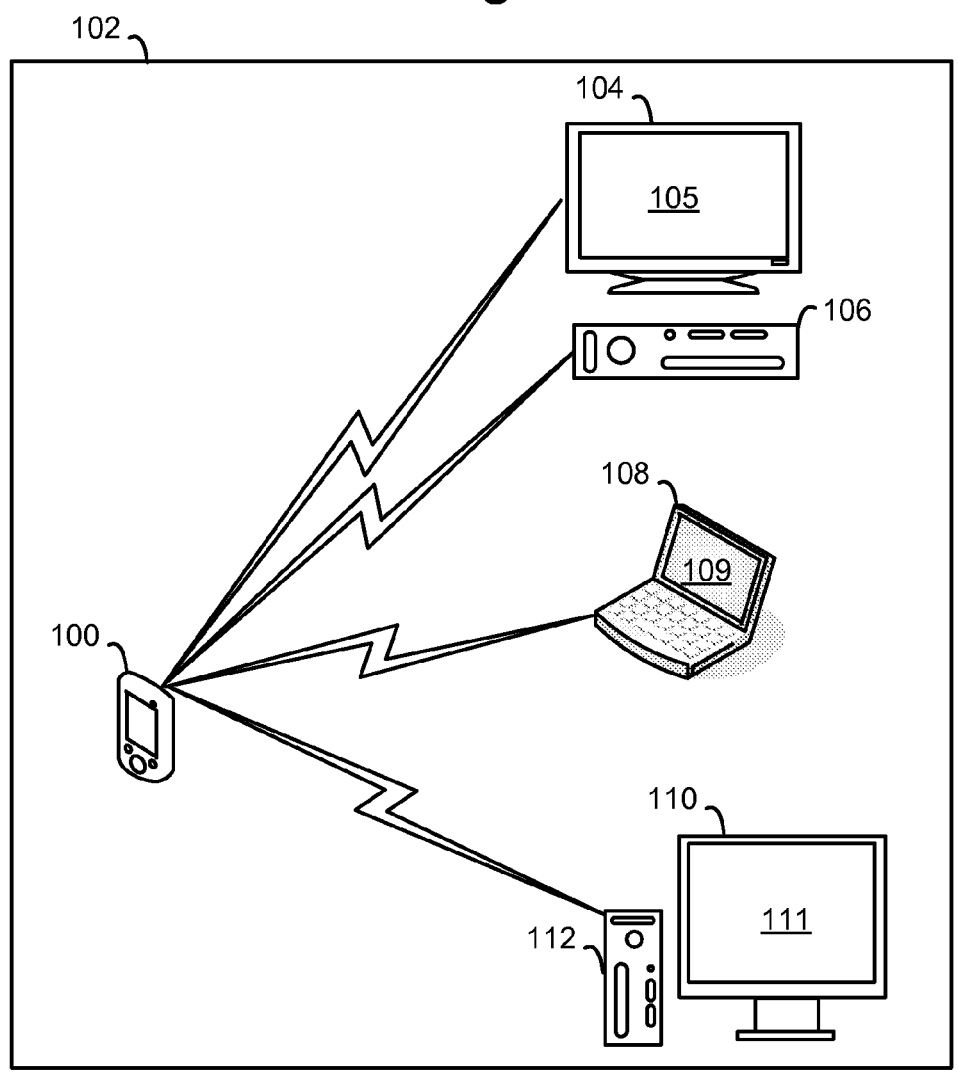
FIG. 1b depicts a mobile device communicating with different electronic appliances by wireless signals.

FIG. 1b depicts a mobile device communicating with different electronic appliances by wireless signals. In a setting 102 such as a room in a user's home, a number of electronic appliances may be present which can be controlled by wireless signals from a mobile device 100. Examples of such electronic appliances include a television 104 having a display device or screen 105, a video game console 106 which may communicate with the television 104, a laptop computer 108 having a display device 109, and a PC 112 which includes a monitor 110 having a display device 111. Another example of an electronic appliance is a set-top box which communicates with the television 104.

While the mobile device 100 typically includes a cell phone capability, other communication technologies such as Wi-Fi, Bluetooth and IrDA (Infrared Data Association) are also currently incorporated into many mobile devices to allow voice and other data communications. Mobile devices generally can include cell phones (including web-enabled smart phones), personal digital assistants (PDAs)/palmtop computers, portable media players (e.g., MICROSOFT ZUNE®, APPLE IPOD®), and laptop computers such as net books, tablet computers, and other devices. A cell phone capability is not necessarily required to perform the automatic configuring described herein.

The electronic appliances include corresponding wireless transmit and receive components which are compatible with the mobile device. Such components can be built into the electronic appliance or connected as peripherals. Regarding the television 104, some televisions have Wi-Fi capabilities built in so that content can be wirelessly streamed to the television via a home network, for instance. Wi-Fi® is a certification of the Wi-Fi Alliance® for certified products based on the IEEE 802.11 standard, and ensures interoperability between different wireless devices. Wi-Fi is a type of wireless local area network (WLAN). Other wireless technologies used by televisions include WiMAX, ultrawideband (UWB), based on the WiMedia standard, Wireless Home Digital Interface (WHDI)™ of the WHDI Special Interest Group, Wireless HD® of the WirelessHD® Consortium, and Wireless Digital Express HD, from Monster Cable Products, Inc. and Sigma Designs, Inc. These wireless technologies are examples of RF wireless communications which may be provided. Laptops and PCs typically include built in Wi-Fi capabilities or accept Wi-Fi cards. Moreover, infrared signals can be used to provide communication between the mobile device 100 and any of the electronic appliances 104, 106, 108 and 112. It is also possible for the electronic appliances to communicate with each other wirelessly.

Example television peripherals which add Wi-Fi capability include the Slingbox from Sling Media, Apple TV from Apple, Inc. and MediaGate Network Multimedia Center, from MediaGate USA.

In some cases, the electronic appliances are close enough to one another and to the mobile device so that multiple electronic appliances receive the wireless signals from the mobile device. In other cases, only one electronic appliance receives wireless signals from the mobile device. Moreover, the electronic appliances may be close enough to one another and to the mobile device so that a camera or other image sensor of the mobile device captures an image or light signals from multiple electronic appliances concurrently. In other cases, only one electronic appliance is sensed by a camera or other image sensor of the mobile device at a time. The use of a camera or other image sensor by a mobile device to identify an electronic appliance is described below.

Figure 2A:
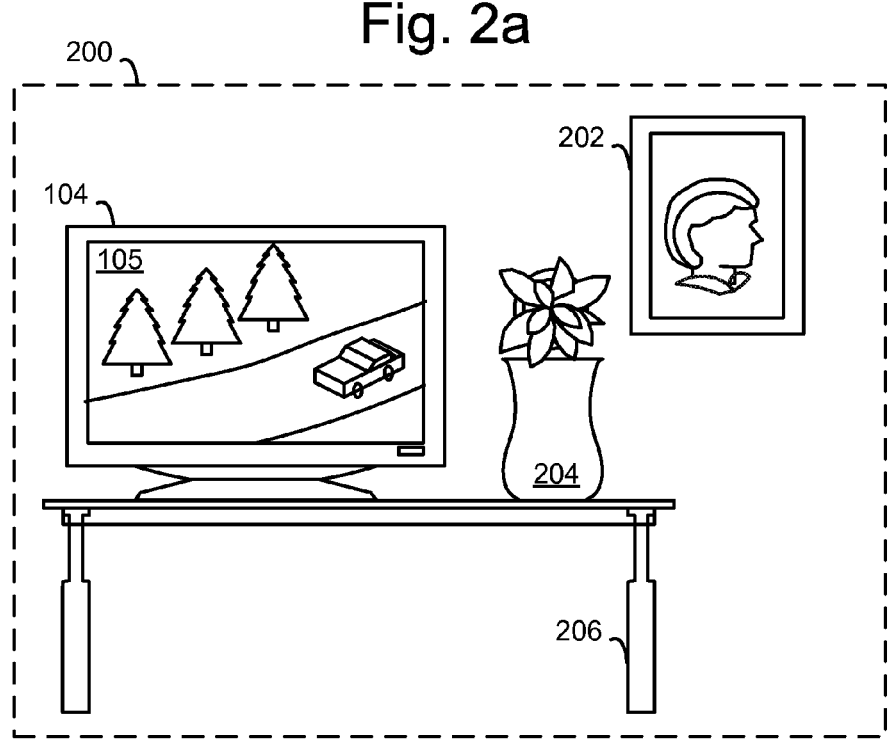
FIG. 2a depicts a mobile device-captured image of an electronic appliance with a display device.

FIG. 2a depicts a mobile device-captured image of a setting which includes an electronic appliance with a display device. Many mobile devices have built in cameras which detect visible light to capture still or video digital images using CMOS multi-megapixel image sensors and store the digital images in JPG, GIF, PNG or other formats. One or more images/pictures which are captured by a camera of the mobile device can be used to identify an electronic appliance which is in the image. In this approach, the user aims the mobile device so that it takes a picture which includes the electronic appliance. For better recognition of the electronic appliance, it should be prominent in the image. The image 200 might be taken by a user sitting on a sofa in front of the electronic appliance 104, for instance. The image 200 includes the television 104 and its display device 105, which shows an example display which currently depicts a car driving on a road. The image 200 also includes other components of a setting in which the electronic appliance is located, such as a table 206, a vase 204 and a wall hanging 202. This is a simplified example of one possible setting.

The mobile device can be activated to capture the image 200 in different ways. In one approach, as mentioned, the user can aim the mobile device and manually take a picture, after entering a polling mode. The image may be captured as part of a polling process in which the mobile device transmits a wireless signal to determine which electronic appliances are within range of the mobile device. Any electronic appliances within range respond to the polling signal with their own wireless signals, which are received by the mobile device. Furthermore, the wireless signals from the electronic appliances can include image data which represents images which are currently being displayed on their associated display devices, as well as control data which identifies a type of the electronic appliance and/or a user interface (UI) settings which can be used by the mobile device to control the electronic appliance. The mobile device compares the image that it captured with its camera to the encoded image data which is received from the electronic appliances to determine if the mobile device is aimed at a particular electronic appliance. If there are multiple matches, a best match is determined, such as based on which electronic appliance is most centrally located in the captured image.

In one possible approach, the user captures the image using a command which also triggers the wireless polling signal. This command may be distinguished from a command for using the camera generally without polling. In another possible approach, the image is captured without a command being manually entered by the user. For example, the mobile device may use an accelerometer and/or other physical sensors to determine when the mobile device has been moved, such as picked up from a table, and/or when the mobile device is held in an orientation which indicates that it is being used as a camera, as discussed below.

Figure 2E:
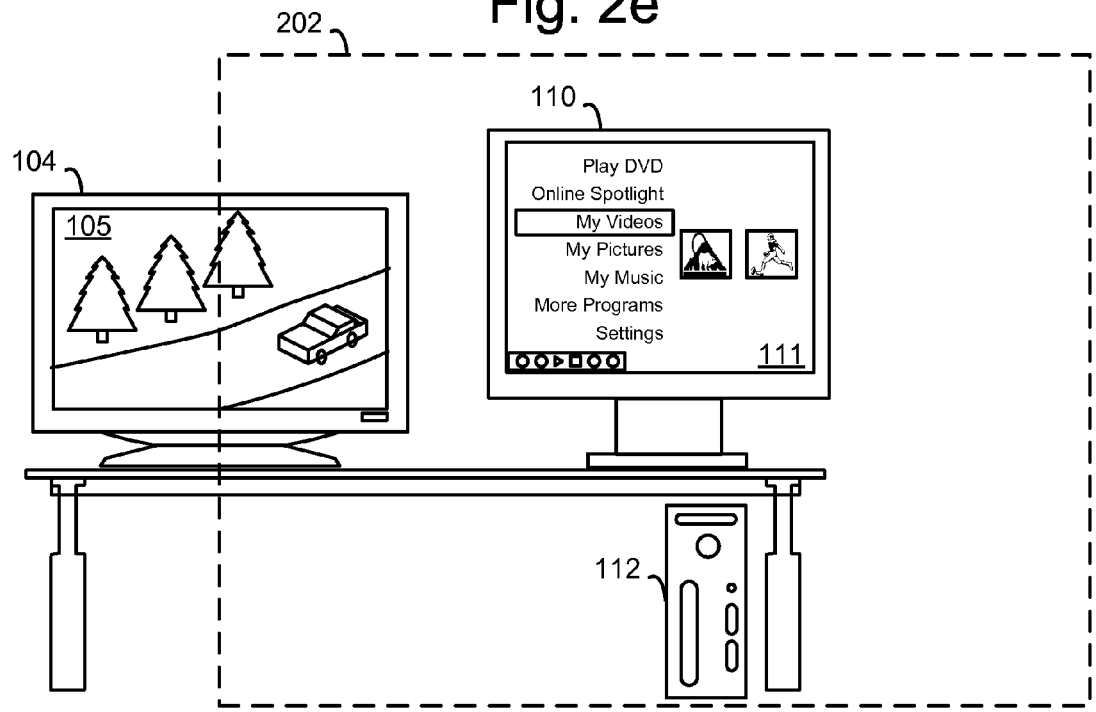
FIG. 2e depicts a mobile device-captured image of a setting which includes multiple electronic appliances with associated display devices.
Figure 2B:
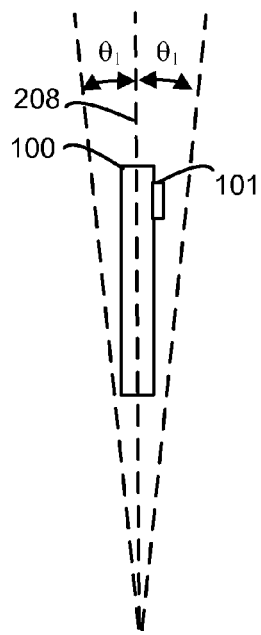
FIG. 2b depicts a first picture-taking orientation criterion of a mobile device.
Figure 2C:
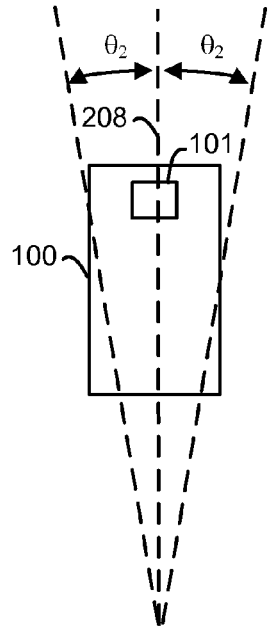
FIG. 2c depicts a second picture-taking orientation criterion of a mobile device.

FIG. 2b depicts a first picture-taking orientation criterion of a mobile device. FIG. 2c depicts a second picture-taking orientation criterion of a mobile device. In one possible implementation, the polling and image capture process is activated when the mobile device is held in an orientation for a certain period of time, e.g., a few seconds, which is interpreted as an orientation in which the mobile device is being aimed to be used as a camera. In another possible approach, the mobile device determines that it has been stationary for a certain period of time directly before it is held in the picture taking orientation. This may occur, for instance, if the mobile device is on a table and the user, sitting on a sofa, picks up the mobile device and aims it at the television 104. Multiple images may similarly be captured in a video in the polling and image capture process. A proximity sensor may also be used to conclude that the mobile device is not being held to the user's head to be used as a phone. Other sensors, such as a grip sensor and light sensor may also be used to determine the orientation of the mobile device or to otherwise identify an intended use interaction. For instance, a touch-sensitive skin of a mobile device can be used as mentioned in connection with FIG. 1a.

A typical mobile device 101 includes a camera lens 101 on a back panel, so that the mobile device is held essentially vertical when the camera lens axis is aimed horizontally, as is typical when taking a picture. This orientation can be determined by sensors in the mobile device. For example, a first picture-taking orientation criterion may be met if a front-to-back tilting angle of the mobile device from a vertical line 208 is within specified boundaries $\pm\theta_1$, mobile device from the vertical line 208 is within specified boundaries $\pm\theta_2$.

Figure 2D:
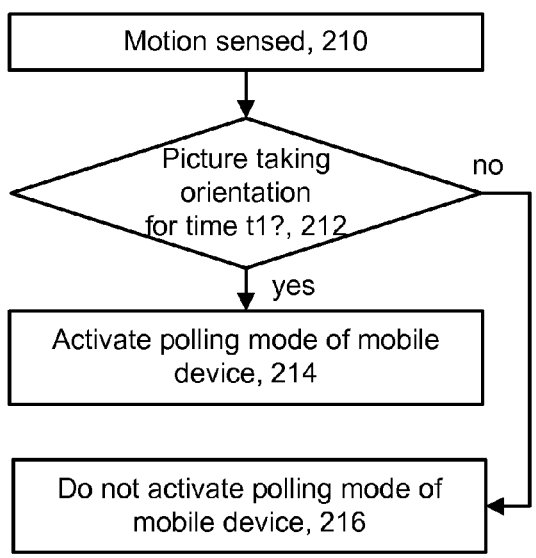
FIG. 2d depicts a process for automatically activating a polling process of a mobile device if the mobile device is in a picture-taking orientation.

FIG. 2d depicts a process for automatically activating a polling process of a mobile device if the mobile device is in a picture-taking orientation. At step 210, motion of the mobile device is sensed. Alternatively, or additionally, capacitive touch sensors on the mobile device can determine that the user has picked up and is holding the mobile device. At step 212, a determination is made as to whether the mobile device is in a picture taking orientation for a period of time t1, e.g., a couple seconds. If it is, a polling mode of the mobile device is automatically activated, at step 214. If the mobile device is not in a picture taking orientation for a period of time t1, a polling mode of the mobile device is not automatically activated, at step 216. The user also can have the option of manually activating the polling mode such as by pressing a key on the mobile device.

FIG. 2e depicts a mobile device-captured image of a setting which includes multiple electronic appliances with associated display devices. In the image 202, the television 104 is accompanied by a second electronic appliance: the PC 112 and monitor 110 with display device 111. The display device is depicted as showing a media center application which is run by software in the PC 112. Examples of media center applications include Windows® Media Center from Microsoft Corporation, Front Row from Apple, Inc., Linux Media Center Edition, an open source platform, and XBMC Media Center interface, also an open source platform. The PC 112 may operate independently of the television 104, or may communicate with the television 104 (by wire or wireless) to display images. Media center applications can also be provided by other devices which provide network services, such as some DVD players, set-top boxes, and video game consoles. A media center application may have a graphical user interface (GUI) which is designed to be seen from several feet away to allow a user to interact with the GUI using a remote control device. For example, the user can remotely control the display of media files such as photos, music, DVDs, and videos. Note that remote PC control can also be used for applications other than media center applications, such as applications for accessing folder or documents.

In this scenario, the image 202 which is captured by the mobile device includes the electronic appliance 110 generally in the center of the image and a portion of the television 104, off to the side of the image.

Figure 2F:
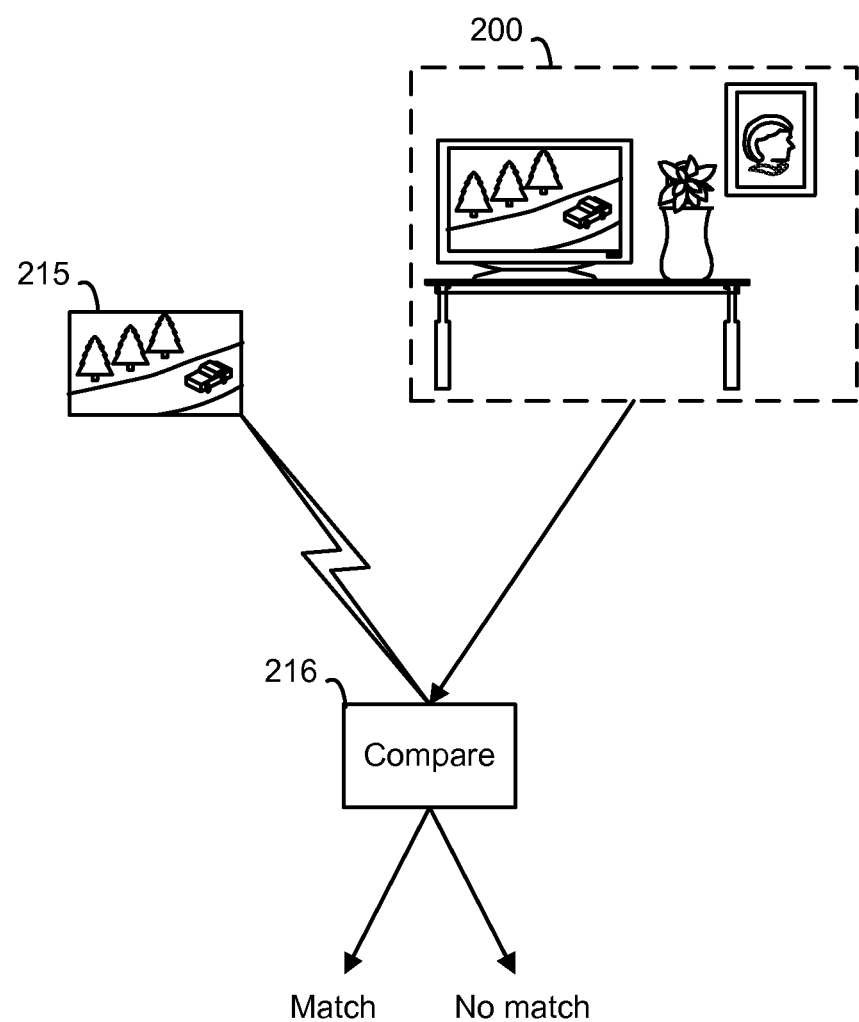
FIG. 2f depicts a comparison of image data transmitted from an electronic appliance with image data captured from a camera of a mobile device.

FIG. 2f depicts a comparison of image data 215 transmitted from an electronic appliance with image data 200 captured from a camera of a mobile device, at a compare function 216 of the mobile device. A match or no match decision can result.

FIG. 3a depicts a mobile device with a touch screen user interface configured for use as a cell phone. As mentioned, a mobile device 100 can be configured to operate in different modes. In one possible approach, the mobile device has a user interface display 300 which can be configured using software to display certain keys which the user selects by placing his or her fingertip on the key. The display may be a touch screen which displays soft keys. However, it is also possible for the user interface to use hard keys, alternatively or additionally, to control the mobile device and an electronic appliance.

Here, the user interface display 300 is in a phone mode, in which the mobile device acts as a cell phone. A region 302 of the user interface display 300 provides a signal strength indicator, the time, a battery strength indicator, a mode indicator which reads "Phone mode," and a window 301. A region 304 provides number keys which can be used to enter a phone number, for instance. The numbers may appear in the window 301. A region 306 includes a call button for placing a call and an end call button. Hard keys 308 may be assigned additional functions for use in the phone mode. The phone mode may be a default mode which the mobile device assumes.

FIG. 3b depicts a mobile device with a touch screen user interface configured for use as a TV remote control. A region 310 of the user interface display 300 indicates that the mobile device is configured in a "TV mode." An on/off button is also provided in region 310. A region 312 provides number keys which can be used to enter a channel number, for instance. A region 314 includes a central button ("ok/Menu") for selecting an entry or invoking an on-screen menu of the television, along with volume up/down arrows and channel up/down arrows. Hard keys 308 may be assigned additional functions for use in the TV mode. The mobile device may automatically enter the TV mode when it detects that it has been pointed at a television, using techniques described herein.

FIG. 3c depicts a mobile device with a touch screen user interface configured for use as a personal computer (PC) remote control. A region 320 of the user interface display 300 indicates that the mobile device is configured in a "PC mode," in which the mobile device acts as a PC remote control, such as for a media center application. Soft key commands in region 320 include Record (Rec), Play, Pause and Stop. Commands in region 322 include Rewind (Rew), Fast Forward (FFwd), Replay and Skip. Commands in region 324 include a Back button, which causes the PC to display a previous page, for instance, an Info button which calls up a help screen, and a Start button which launches applications and tasks. The region 324 also includes a central button ("ok") for selecting an entry, along with volume up/down arrows and a channel or program (Pgm) up/down arrows. Hard keys 308 may be assigned additional functions for use in the PC mode. The mobile device may automatically enter the PC mode when it detects that it has been pointed at a PC, using techniques described herein.

FIG. 4a depicts a method in which a mobile device automatically configures itself for use with an electronic appliance by comparing a mobile device-captured image of the electronic appliance with image data transmitted by the electronic appliance. Note that the steps depicted in this and other flowcharts are not necessarily performed as discrete steps and/or in the sequence depicted, but can occur concurrently and/or in different sequences. At step 400, the mobile device is activated such as by a user command or in response to a motion/orientation sensor, as discussed previously. At step 402, the mobile device transmits a wireless signal, such as an RF or infrared signal, to one or more electronic appliances, that is, any network-capable electronic appliance which has an associated display. At step 404, an electronic appliance receives the wireless signal from the mobile device. As this time, the electronic appliance may be in the process of displaying images on its display device. For example, a television may be displaying a live broadcast television program or a recorded movie from a DVD. A PC may display static or moving images from an application such as a media center application, web page, desktop application such a word processing application or spreadsheet application, and so forth.

The electronic appliance can continue to display images as it would have done in the absence of receiving a wireless signal from the mobile device, in one approach. Or, the electronic appliance can display a new image in response to receiving the wireless signal from the mobile device, at step 406. For example, this can be a predefined image which can be readily detected by the camera of the mobile device, such as a pattern of broad stripes, as depicted in FIG. 4b. FIG. 4b depicts a predefined image which is displayed on a display device of an electronic appliance in response to receipt of a wireless signal from a mobile device. The predefined image could be displayed for a short time, about one second, which is sufficient to allow the mobile device to capture an image without disrupting the existing television program or other content. Further, the appearance of the predefined image informs the user that the polling process has successfully been initiated. Other ways to inform the user that the polling process has successfully been initiated include the electronic appliance temporarily freezing the current image, or providing some other visible effect to the current image, such as darkening the image, or providing a graphic such as "control request detected," or providing an audio feedback such as a beep. The mobile device could also provide an audio or visual feedback to inform the user that the polling process has successfully been initiated.

The wireless signal provided by the mobile device can be encoded with commands for controlling the electronic appliance to take the appropriate actions as described herein.

At step 408 in FIG. 4a, the electronic appliance obtains image data from the displayed image. For example, this can involve obtaining image data of a frame of pixels which is currently being displayed on the display device. The image data can be provided in any specified format. The image data can be provided by transcoding data from an incompatible format to a format which is compatible with the mobile device. Furthermore, the image data can be processed such as by identifying certain features of the image to facilitate a subsequent image correlation process which takes place at the mobile device. One example is to process the image using SIFT, discussed further below, to obtain component subregion descriptors which define scale-invariant features of the image, and storing the descriptors instead of pixel data.

At step 410, the electronic appliance transmits a reply wireless signal with image data and control information to the mobile device. The image data may or may not be in a format which can be used to recreate the corresponding displayed image. The reply wireless signal can be transmitted as an RF or infrared signal, for instance. The control information can identify, e.g., a type of the electronic appliance, such as television model or PC model, or merely the fact that the electronic appliance is a television or PC, and the operating system and application which are currently active in the PC. The control information can also identify the format in which the image data is provided, e.g. by coding format or resolution. The control information can also identify a user interface configuration and communication protocol which can be used by the mobile device to control the electronic appliance.

For instance, different types of electronic appliances may require different user interface configurations communication protocol. A user interface configuration can include an appearance of keys in a user interface display (as depicted, e.g., in FIGS. 3b and 3c), while a communications protocol can include a specification of code words for controlling the electronic appliance. In some cases, a common UI appearance can be used for controlling one type of electronic appliance, such as a television, but different communication protocols are used with the different television models and/or manufacturers. For example, different frequencies, code words and so on may be used to implement different commands. The control information received from the electronic appliance can identify the communication protocol directly, such as by specifying the frequencies and code words, or indirectly, such as by specifying an identifier which the mobile device can use to map to the communication protocol. The identifier can indicate, e.g., "use communication protocol #10," in which case the mobile device accesses the necessary information for implementing the protocol based on the identifier, either locally at the mobile device or from a remote or local server. The control information could also identify a type of the electronic appliance, e.g., television or PC, in which case the mobile device implements a user interface display which is appropriate for a television (e.g., FIG. 3b) or PC (e.g., FIG. 3c), for instance.

At step 412, the mobile device receives the reply wireless signal with the image data and control information. At step 414, the mobile device captures, e.g., takes a picture of, an image which includes the electronic appliance and its displayed image, using a camera of the mobile device. The captured image is used to provide reference image data. As with the image data provided by the electronic appliance, the image data provided by the mobile device may undergo some processing which facilitates a subsequent image correlation process, such as processing to obtain component subregion descriptors using by the SIFT algorithm. Thus, the image data which is obtained may or may not be in a format which can be used to recreate the corresponding captured image.

Regarding the timing of step 414, where the mobile device captures an image, this can be triggered by different precursor events. For example, image capture can be triggered by the mobile device transmitting a wireless signal (step 402) without waiting for the reply signal from the electronic appliance (step 412). Or, image capture can be triggered by receipt of the reply signal.

At step 416, the mobile device compares the reference image data to the image data which was received from the electronic appliance. This can involve performing any type of image correlation algorithm. For example, the reference image can be compared to successive pixel locations across the image from the electronic appliance, and a correlation score determined for each location. The location with the highest score may represent a match with the reference image. A match can involve a probabilistic measure, so that matches can occur with different probabilities or levels of certainty. A match which is considered to be acceptable may be associated with a minimum probability. The comparison of step 416 could alternatively involve the SIFT algorithm, discussed further below. At decision step 418, if a match is determined, at step 422, a user interface configuration and/or communication protocol is identified based on the control information received from the electronic appliance, such as by mapping an identifier of the control information to a UI display configuration and/or a communications protocol. Step 424 includes configuring the mobile device with the identified user interface configuration and/or communications protocol. A feedback (e.g., a beep or visual message) to the user that the mobile device has been successfully associated to the electronic appliance can be provided, so that the user knows he or she can discontinue aiming the mobile device at the electronic appliance, and can begin using the mobile device as a remote control for the electronic appliance.

If there is no match at decision step 418, an error message can be displayed to the user via the mobile device, at step 420. For example the message can say: "No electronic appliance was identified, please try again," in which case the process can be repeated at step 400. The user may attempt to improve the chance of success such as by standing closer to the electronic appliance, changing lighting conditions such as by turning on a light, setting a zoom feature of the camera, or otherwise adjusting camera settings, or aiming the camera more accurately at the electronic appliance which the user desires to control.

The user can thus aim the mobile device at an electronic appliance and have the mobile device automatically associate itself with the electronic appliance. Moreover, since a visual line of sight between the mobile device and the display device of the electronic appliance is used, this avoids a potential for the mobile device to associate with another electronic appliance which is in the vicinity of the mobile device but not in the line of sight. This could occur in an environment in which many electronic appliances are within range of the mobile device. Also avoided is the potential for other mobile devices which are within range of a replying electronic appliance to become inadvertently configured for use with the replying electronic appliance.

FIG. 4c depicts a method in which a mobile device automatically configures itself for use with an electronic appliance by comparing a mobile device-captured image of multiple electronic appliances with image data transmitted by the electronic appliances, and selecting a best match among the multiple electronic appliances.

The method is similar to that in FIG. 4a except that multiple electronic appliances are involved. At step 430, the mobile device is activated. At step 432, the mobile device transmits a wireless signal to one or more electronic appliances. At step

434, multiple electronic appliances receive the wireless signal. The electronic appliances can continue to display images as they would have done in the absence of receiving a wireless signal from the mobile device, in one approach. Or, the electronic appliances can display a predefined image, at step 436. It is also possible for different electronic appliance to display different predefined images. For example, televisions may display one image and PCs display another image. Or, the predefined image may be randomly selected by each electronic appliance from a set of images so that each electronic appliance displays a different predefined image. In this case, multiple electronic appliances next to each other would display difference predefined images so that they could be distinguished from one another.

At step 438, the multiple electronic appliances obtain image data from their associated displayed images. At step 440, the multiple electronic appliances transmit reply wireless signals with image data and control information to the mobile device. At step 442, the mobile device receives the multiple reply wireless signals with the image data and control information. At step 444, the mobile device captures an image which includes some or all of the electronic appliances and their displayed images, to provide reference image data.

At step 446, the mobile device compares the reference image data to the image data which was received from the multiple electronic appliances. From these comparisons, matching electronic appliances are determined at step 448, and a best match is determined at step 450. For example, an image of an electronic appliance which is most central in the reference image data may be selected, based on the assumption that the user aimed the camera most directly at the electronic appliance he or she desired to control. At step 452, a UI configuration and/or communication protocol is identified based on the control information received from the best match electronic appliance. Step 454 includes configuring the mobile device with the identified UI configuration and/or communications protocol.

FIG. 5 depicts a method in which a mobile device controls an electronic appliance after a user interface of the mobile device is configured for use with the electronic appliance. Once the UI configuration and/or communications protocol which are needed to control a particular electronic appliance are identified, the UI display/touch screen 300 can be configured with a virtual keypad to control the electronic appliance, such as previously discussed in connection with FIG. 3*b* or 3*c*. At step 502, the user selects a command from the virtual keypad. For example, the user may select a "channel up" button from the interface of FIG. 3*b* to control a television. At step 504, the mobile device transmits a wireless signal to the electronic appliance with data identifying the command, according to the communications protocol which is suitable for the electronic appliance. At step 506, the electronic appliance receives the wireless signal and executes the command. Advantageously, the user is able to control the electronic appliance as if the mobile device were a dedicated remote control device for that electronic appliance. The mobile device can act as a universal remote control which is able to control many electronic appliances. Furthermore, switching between electronic appliances can be accomplished automatically and quickly.

Figure 6A:
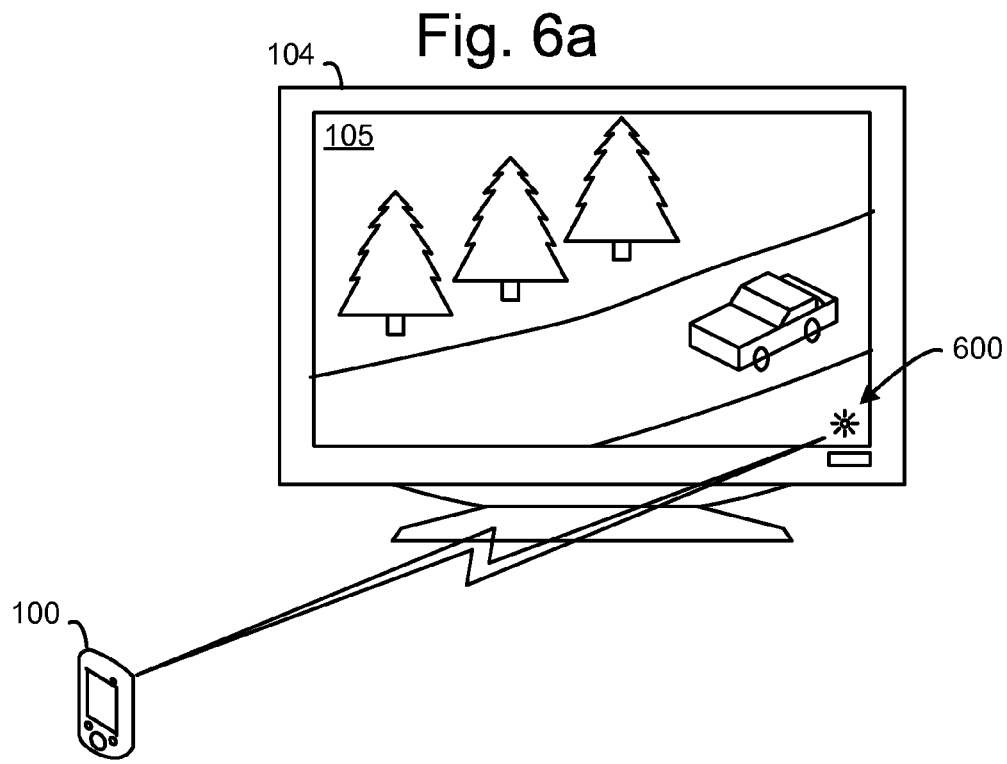
FIG. 6a depicts a mobile device sensing a synchronization image which is provided on a display device of an electronic appliance.

FIG. 6*a* depicts a mobile device sensing a synchronization image which is provided on a display device of an electronic appliance. In this approach, when an electronic appliance receives a wireless polling signal from the mobile device, it instructs its display device to display a synchronization image which can be sensed by the mobile device. The synchronization image can be a visible image such as a short series of white or other bright flashes. The mobile device can use a light sensor which can be separate from a camera, or it can be a camera operating in a light sensing mode. The light sensor detects light at a specified frequency/color, and with a specified repetition frequency or other pattern. This approach can reduce costs since the sensor can be a lower cost item than a camera, and processing is reduced because image correlation need not be performed. However, an existing camera operating in the mobile device operating in a video capture mode or otherwise keeping it shutter open for a sufficient period of time, can be used as well.

In the display device 105 of the electronic appliance/television 104, a region 600 of the display device 105 is used to emit a bright flashing light which is sensed by the mobile device. The region 600 takes up only a portion of the display device and is combined or overlaid with the existing display, which is not displayed in response to receipt of a wireless signal from the mobile device. The region 600 is displayed in response to the receipt of the wireless signal from the mobile device. It is also possible for the flash to consume the entire display device 105. Moreover, the flashing light can follow a pattern which communicates information to the mobile device. That is, the flashes can represent code words which the mobile device can decode. For example, the information may identify a type of the electronic appliance, e.g., television or PC, and/or a communications protocol which the mobile device can use to control the electronic appliance.

Figure 6B:
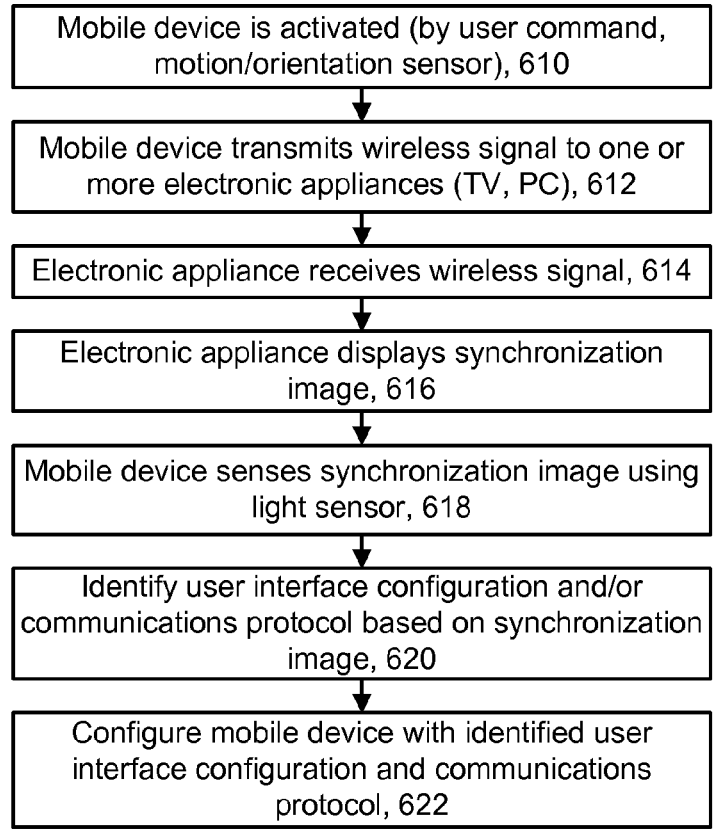
FIG. 6b depicts a method in which a mobile device automatically configures itself for use with an electronic appliance by sensing a synchronization image which is provided on a display device of the electronic appliance.

FIG. 6*b* depicts a method in which a mobile device automatically configures itself for use with an electronic appliance by sensing a synchronization image which is provided on a display device of the electronic appliance. At step 610, the mobile device is activated. At step 612, the mobile device transmits a wireless signal to one or more electronic appliances. At step 614, an electronic appliance receives the wireless signal. At step 616, the electronic appliance displays a synchronization image. At step 618, the mobile device senses the synchronization image using a light sensor. At step 620, a UI configuration and/or communications protocol are identified based on the synchronization image. At step 622, the mobile device is configured with the UI configuration and/or communications protocol.

Figure 7A:
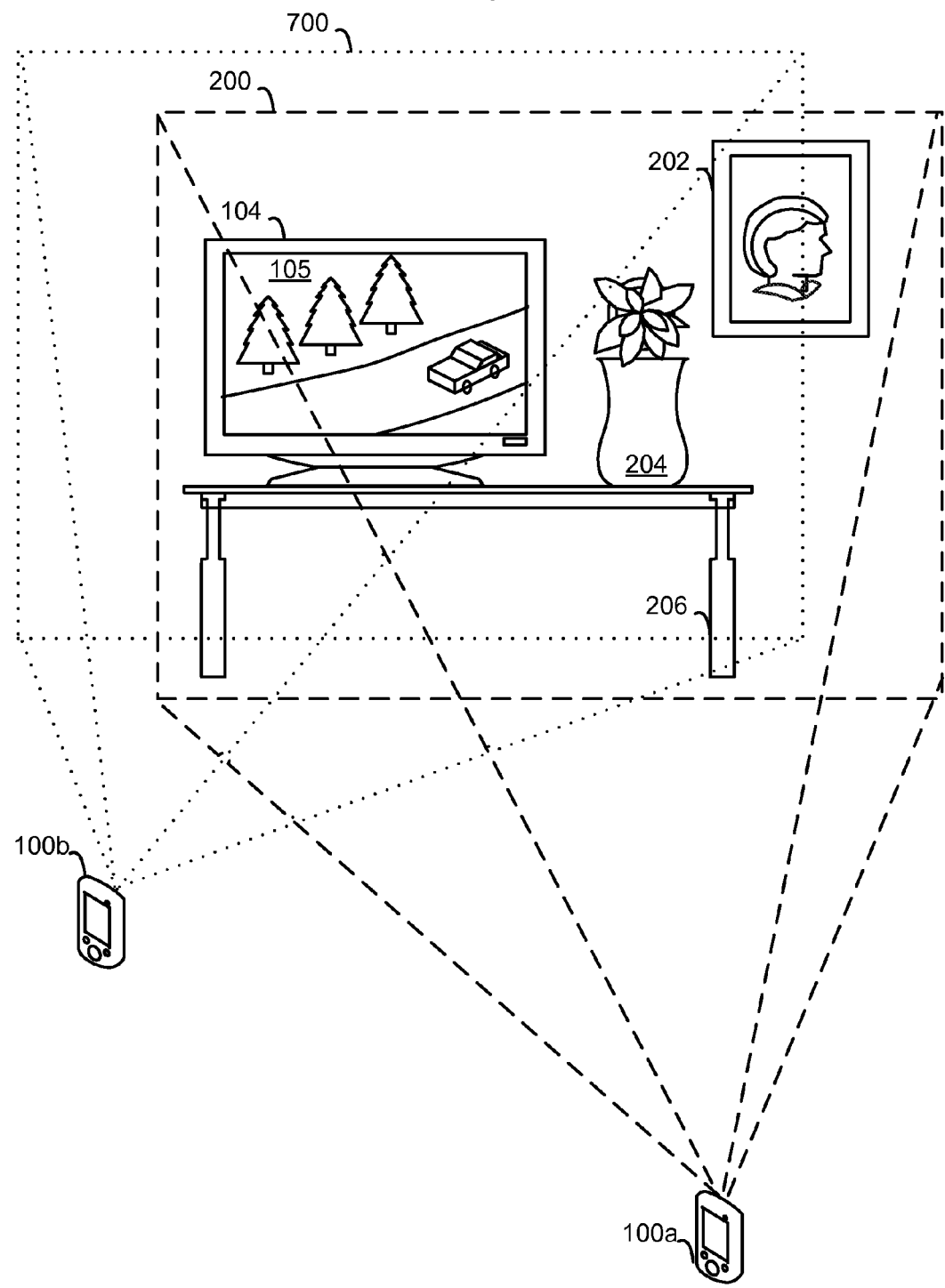
FIG. 7a depicts mobile device-captured images of a setting taken from different perspectives and distances, where the setting includes an electronic appliance with a display device.

FIG. 7*a* depicts mobile device-captured images of a setting taken from different perspectives and distances, where the setting includes an electronic appliance with a display device. This approach does not require polling and receiving a reply from the electronic appliance, and can be accomplished by the mobile device alone. The mobile device 100*a* at a first time captures an image 200 of a setting (same as in FIG. 2*a*) in a setup phase. The electronic appliance 104 is depicted. The user may manually configure the mobile device with information for controlling the electronic appliance, such as by accessing a menu of electronic appliances and models and selecting the appropriate entry for the electronic appliance 104, e.g., "Samsung FP-T5894W," an example television. The menu may be web-based, for instance. The image 200 is then stored in the mobile device, cross-referenced to the control and configuration information.

Subsequently, in an implementation phase, when the user is near the electronic appliance 104, the mobile device is activated, e.g., based on a user command or motion/orientation sensor, as discussed previously, to capture another image of the electronic appliance. Specifically, the same mobile device at a later, second time, such as hours, days or weeks later, identified by the mobile device 100*b*, captures an image 700 of the electronic appliance. The two images can be compared to each other to determine whether there is a match. If there is a match, the mobile device automatically configures itself to control the electronic appliance. A match indicates that the images are of the same electronic appliance. The specific images displayed on the display device of the electronic device are not important, as different images are displayed at different times.

The image need not be captured from the same perspective and distance, as various image processing algorithms can detect a match even with these variations. For example, the second image may be processed using the Scale-Invariant Feature Transform (SIFT) algorithm, described in U.S. Pat. No. 6,711,293 (David G. Lowe, Mar. 23, 2004), titled "Method and apparatus for identifying scale invariant features in an image and use of same for locating an object in an image," and incorporated herein by reference. The SIFT algorithm detects and describe local features in images. Moreover, SIFT features are local and based on the appearance of the object at particular interest points, and are invariant to image scale and rotation. So, different images of an electronic appliance can be correlated even if they are taken, e.g., from the left and right sides of the electronic appliance, and from different distances. SIFT features are also robust to changes in illumination, noise, and minor changes in viewpoint. The SIFT features are highly distinctive, relatively easy to extract, allow for correct object identification with low probability of mismatch and are easy to match against a (large) database of local features. Object description by set of SIFT features is also robust to partial occlusion. As few as three SIFT features from an object are enough to compute its location and pose. Further, recognition can be performed in close-to-real time. Other image processing algorithms may be used as well.

Note that the features in the setting which are identified by the image processing algorithms can be associated with the electronic appliance, and/or other features in the setting, to determine that the mobile device is in the same place as when the first image was captured. For example, the physical appearance of the electronic appliance, such as its shape, as well as the appearance of other items in the setting, e.g., the vase 204, table 206 and wall hanging 202, can be used to identify features and determine whether two images match.

FIG. 7b depicts a setup phase of a method in which a mobile device automatically configures itself for use with an electronic appliance by capturing an image of a setting which includes the electronic appliance and comparing the image to a previously-captured image of the setting taken from a different perspective and distance. The setup phase begins at step 710. At step 712, the mobile device is activated. This can occur automatically, such as based on an orientation of the mobile device and/or by use of other sensors such as a grip sensor and light sensor. Or, the user may enter a command which causes the mobile device to present an appropriate user interface, such as discussed in connection with FIG. 7d.

At step 714, the mobile device uses its camera to capture a first image of a setting which includes an electronic appliance. At step 716, scale-invariant features of the first image are determined, in one possible implementation. See FIG. 7e for additional details. At step 718, the mobile device stores first data which represents the scale-invariant features of the first image in a library. At step 720, the user provides a command to select a type of the electronic appliance, e.g., TV or PC, such as by pressing a key in the UI discussed in connection with FIG. 7d. At step 722, the mobile device stores data which associates a user interface configuration and/or communications protocol with the first image, based on the type of electronic appliance. As mentioned, this could include the user manually configuring the mobile device, such as by accessing a menu of electronic appliances and models and selecting the appropriate entry for the electronic appliance, based on the type of the electronic appliance. In some cases, once the type of the electronic appliance is known, an appropriate UI configuration and/or communications protocol can be identified without further input by the user. For example, one UI configuration and/or communications protocol can be used for a television, and another UI configuration and/or communications protocol can be used for a PC. It is also possible for the mobile device to communicate with the electronic appliance after the setup phases to obtain further information for controlling the electronic device.

FIG. 7c depicts an implementation phase which follows the setup phase of the method of FIG. 7b. The implementation phase starts at step 730. At step 732, the mobile device uses its camera to capture a second image of the setting which includes the electronic appliance. At step 734, second data is determined which represents scale-invariant features of the second image, in one possible implementation. See FIG. 7e for additional details. At step 736, the mobile device determines if the second data matches data in the library, which can include scale-invariant features of one or more reference images of electronic appliances, such as different televisions and PCs, and their settings. See FIGS. 7f and 7g for additional details. If there is a match, at decision step 738, the mobile device is configured with the UI configuration and/or communications protocol associated with the matching reference image in the library, at step 742. If there is no match at decision step 738, an error message can be displayed to the user via the mobile device, at step 732. For example the message can say: "No electronic appliance was identified, please try again," in which case the process can be repeated at step 720. The user may attempt to improve the chance of success such as by standing closer to the location at which the first image was obtained, changing lighting conditions such as by turning on a light, holding the camera more steady, or otherwise adjusting camera settings, or aiming the camera more accurately at the electronic appliance which the user desires to control.

Figure 7D:
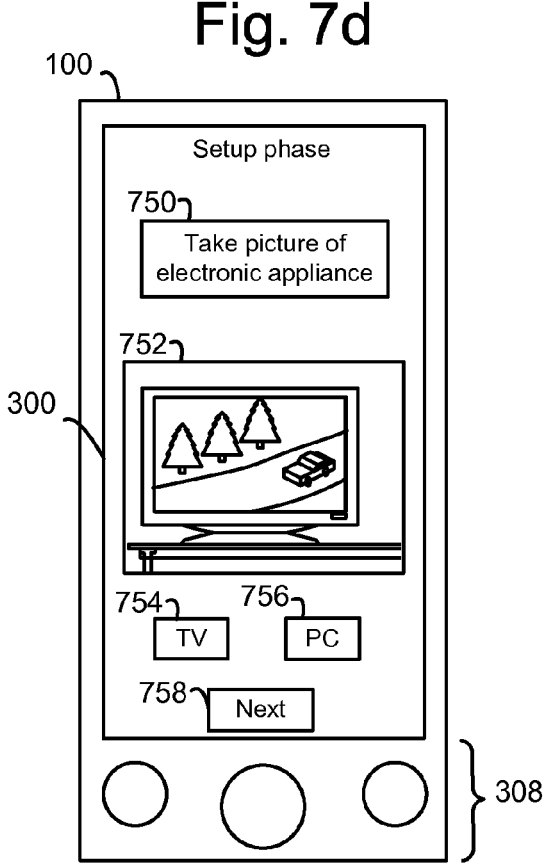
FIG. 7d depicts a mobile device with a touch screen user interface configured for capturing an image of an electronic appliance in a setup phase of the method of FIG. 7b.

FIG. 7d depicts a mobile device with a touch screen user interface configured for capturing an image of an electronic appliance in a setup phase of the method of FIG. 7b. The mobile device 100 includes a user interface display 300 with a virtual key 750 which the user selects to take a picture of an electronic appliance. A region 752 depicts the resulting picture. Virtual keys 754 and 756 can be selected by the user to identify a type of the electronic appliance as a television or PC, respectively, for instance. The user may also navigate a menu to specifically identify the type of electronic appliance such as by manufacturer and model. A "next" key 758 allows the user to continue the setup phase with another electronic appliance. Hard keys 308 may also be used.

Figure 7E:
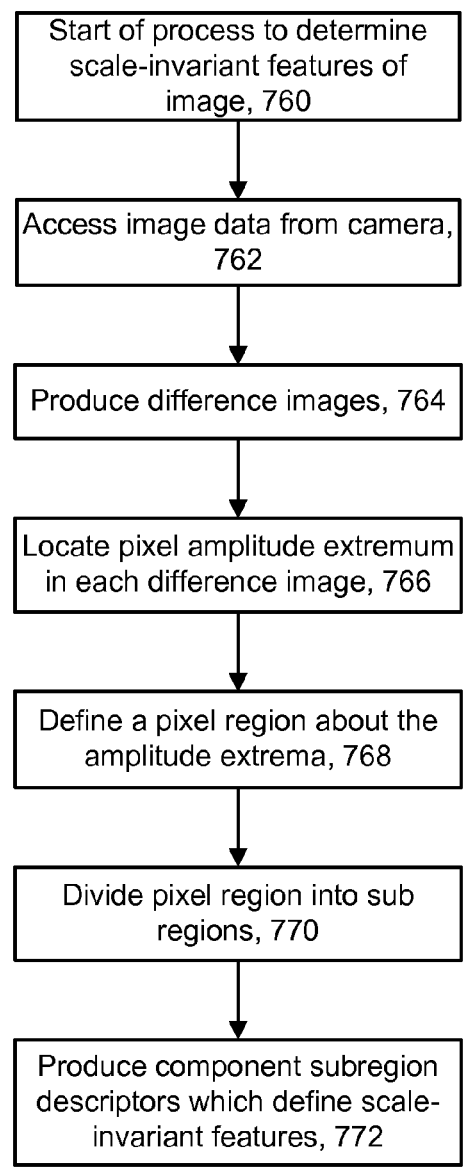
FIG. 7e depicts a process for determining scale-invariant features of an image.

FIG. 7e depicts a process for determining scale-invariant features of an image. The process can be used to implement step 716 of FIG. 7b and step 734 of FIG. 7c. In one possible implementation, a Scale-Invariant Feature Transform (SIFT) algorithm can be used to compare two images. Other image comparison algorithms can be used as well. Step 760 is the start of the process. At step 762, image data from a camera is accessed. Step 764 includes producing difference images from the initial image by successively blurring the image to produce a blurred image, and subtracting the blurred image from the initial image. Successive blurring and subtracting may be used to produce successive difference images, where the initial image used in a successive blurring step includes a blurred image produced in a predecessor blurring step. Step 766 includes locating pixel amplitude extrema in the difference images. This may include comparing the amplitude of each pixel in an image under consideration, with the amplitudes of pixels in an area about each pixel in the image under consideration, to identify local maximal and minimal amplitude pixels. The area about the pixel under consideration may involve an area of pixels in the same image and an area of pixels in at least one adjacent image, such as a predecessor image or a successor image, or both.

Step 768 includes defining a pixel region about the amplitude extrema in a given difference image. A region is defined as a plurality of locations, arranged in an orientation about a corresponding extremum. Regions can be of any size, depending upon the resolution desired for the application. In some case, regions defined in a grid of 16×16 pixels are suitable. Step 770 includes dividing a pixel region into subregions. Step 772 includes producing a plurality of component subregion descriptors for each subregion of a pixel region about pixel amplitude extrema in a plurality of difference images produced from the image. The plurality of component subregion descriptors define scale-invariant features of the image which was captured by the camera of the mobile device.

FIG. 7f depicts a first part of a process for matching images based on scale-invariant features. Step 774 is the start of a process for determining if an image under consideration matches data in a library. Step 776 includes retrieving a group of, e.g., eight sets of component subregion descriptors representing a scale-invariant feature of the image under consideration. Step 778 includes retrieving, from the library, the closest matching group of eight sets of component subregion descriptors representing a scale-invariant feature, which is defined as the feature having the minimum sum of squared differences of each descriptor in each set. This can be found by computing a distance to each descriptor in turn. This could also be performed by applying the well-known k-d tree algorithm.

Step 780 includes applying the groups representing the library scale-invariant feature and the considered image scale-invariant feature to a Hough transform. Decision step 782 determines whether or not the last groups representing the last image scale-invariant feature have been considered and, if not, step 784 includes addressing the next group representing the next scale-invariant feature of the image under consideration, and processing resumes at step 776. If the last scale-invariant feature has been considered at decision step 782, step 786 includes reading the Hough transform output to identify likely objects containing three or more scale-invariant features that match, between the image and the library. Effectively, the Hough transform provides a list of likely objects, based on the scale-invariant features associated with such objects in the library, together with a list of scale-invariant features of the image under consideration, which match scale-invariant features from the library. After having produced a list of likely objects and matching features, each object on the list is applied to a process as shown in FIG. 7g.

FIG. 7g depicts a second part of a process for matching images based on scale-invariant features. The Hough transform may produce a list of reference component descriptors of objects within the image under consideration and a list of matching reference component descriptors from the library of scale-invariant features. These lists may be applied to a least squares fit algorithm, which attempts to identify a plurality of best fitting reference component descriptors identifying one of the likely objects. Having found the best fitting subregion descriptors, the image from which the reference component descriptors were produced may be readily identified and, consequently, the scale and orientation and identification of the object associated with such reference component descriptors may be determined to precisely identify the object, its orientation, its scale and its location in the image under consideration.

Specifically, the second part of the process applies a least squares data fitting algorithm to the groups of component descriptors which represent scale-invariant features associated with the object and to the matching groups of component descriptors representing scale-invariant features of the image under consideration, to determine the degree of matching/correlation. If the degree of matching is high, then the object is indicated as being present in the image, and if not, then a further object on the list is considered.

Step 788 includes retrieving the groups of component descriptors representing scale-invariant features of a likely object produced by the Hough transform from the groups of component descriptors in the library of scale-invariant features. Step 790 includes retrieving the matching scale-invariant feature groups of component descriptors from the image under consideration. Step 792 includes applying the retrieved groups of component descriptors representing scale-invariant features of the likely object and the retrieved matching groups of component descriptors representing scale-invariant features of the image under consideration to a least squares data fitting algorithm, to determine the location of the object, the size of the object relative to the scale of the image of the scale-invariant feature from the library, the orientation of the object, and an error residual value or degree of correlation.

At decision step 794, if the error residual value or degree of correlation is greater than a predefined threshold, then it is assumed that the object is unlikely to be depicted in the image under consideration, and decision step 796 determines whether or not the last object in the list has been considered. If the last object in the list has been considered, the process ends at step 797. If the last object in the list has not been considered, step 798 includes addressing the next object in the list, and processing is resumed at step 788.

If, at decision step 794, the error residual is determined to be less than the predetermined threshold value, step 795 includes indicating the likely object's location, size and orientation.

In the above manner, the presence or absence of objects for which there is a stored image in the reference library, is indicated, together with other physical information about the objects. Thus, after a setup phase occurs in which scale-invariant features are identified and stored in a library for one or more electronic devices, an implementation phase can occur in which an image of one of the electronic devices is captured and processed for comparison with one or more candidates in the library to identify a match. Based on the match, the mobile device is configured with a corresponding UI configuration and/or communications protocol.

FIG. 8a depicts an electronic appliance displaying information to mirror a user interface of a mobile device, after the mobile device is automatically configured for use with the electronic appliance. Once a mobile device 100 has the ability to control an electronic appliance 104, it can act as a conventional remote control device for that electronic appliance to control what is displayed by the display device 105 of the electronic appliance. In another aspect, the mobile device 100 can communicate data to the electronic appliance for display on the display device. For example, all or a portion 810 of the display device 105 can mirror (replicate) what is displayed on the user interface display 300 of the mobile device 100. A remaining portion 812 of the display device 105 can continue to provide the usual content which is provided by the display device. Furthermore, various triggers can cause the mobile device to instruct the electronic appliance to display information.

For example, when the mobile device receives an incoming phone call, the mobile device may control the display device to mirror the user interface display 300, which includes a region 802 with a signal strength meter, time display and battery strength indicator. The mobile device may have the ability to access contacts using a caller identification feature in which the phone number of the caller is sensed and used to look up and display previously stored records. For example, a region 804 provides a name and image of the caller, and a region 806 provides personal information regarding the caller, including notes made by he user, as well as a soft key for ending the call. Hard keys 308 may also be used. The information displayed on the user interface display 300 relates to the incoming telephone call.

Another possible trigger occurs when the user interacts with the mobile device, causing it to display new information, or when the mobile device displays new information without the user interacting with it, such as when a reminder of an event on a calendar reminder system is displayed. For example, the user may view photos stored in the mobile device, in which case the photos are also displayed on the display device 105.

Note that the portion 810 of the display device 105 which mirrors what is displayed on the user interface display 300 can remain for a specified period of time before disappearing, or it can remain until the user enters a command for removing it. Moreover, it is not necessary for the display device 105 to mirror the UI display 300, as the information on the UI display 300 can be provided in a different format on the display device 105. For instance, a text description of the contact can be displayed at the bottom of the display device 105. In another possible aspect, certain types of contacts, e.g., personal, work, family, or certain individual contacts, can be configured by the user to trigger the display 810, while other contacts do not trigger the display 810. Further besides an incoming phone call, other incoming message such as SMS text message and emails can be triggers.

FIG. 8b depicts a method in which an electronic appliance displays contacts information of a caller to a mobile device, after the mobile device is automatically configured for use with the electronic appliance. At step 820, the user interface (UI) of the mobile device is configured to control an electronic appliance, e.g., using the techniques described herein. At step 822, an incoming telephone call is received by the mobile device. At step 824, the mobile device uses a caller id function to obtain the telephone number of the caller. At step 826, the mobile device accesses contacts information based on the telephone number. At step 828, the mobile device displays the contacts information on its UI display (FIG. 8a). Note that this can occur when a call is received and before the call is answered. The user may decide to not answer the call based on the contacts information. At step 830, the mobile device transmits a wireless signal to the electronic appliance with image data from the UI display. This can be achieved using image data in any format which is compatible with the electronic appliance. At step 832, the electronic appliance receives the wireless signal and provides the UI display on the display device (FIG. 8b).

FIG. 8c depicts a method in which an electronic appliance mirrors a user interface of a mobile device, after the mobile device is automatically configured for use with the electronic appliance. This approach involves transmitting UI data to the electronic appliance whenever the UI display 300 is updated. At step 840, the UI of the mobile device is configured to control an electronic appliance. At step 842, the user interacts with the mobile device, so that, at step 844, the mobile device updates its UI display. In response, at step 846, the mobile device transmits a wireless signal to the electronic appliance with image data from the UI display. At step 848, the electronic appliance receives the wireless signal and provides the UI display on the display device (FIG. 8b).

FIG. 9a depicts an example block diagram of a mobile device. Exemplary electronic circuitry of a typical cell phone is depicted. The circuitry 900 includes control circuitry 912 that can include one or more microprocessors, and memory 910 (e.g., non-volatile memory such as ROM and volatile memory such as RAM) which stores processor-readable code which is executed by one or more processors of the control circuitry 912 to implement the functionality described herein. The control circuitry 912 also communicates with RF transmit/receive circuitry 906 which in turn is coupled to an antenna 902, with an infrared transmitted/receiver 908, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a microelectromechanical system (MEMS) which is a tiny mechanical device (of micrometer dimensions) built onto a semiconductor chip. Acceleration direction, as well as orientation, vibration and shock can be sensed. The control circuitry 912 further communicates with a ringer/vibrator 916, a user interface keypad/screen 918, a speaker 920, a microphone 922, a camera 924, a light sensor 926 and a temperature sensor 928.

The control circuitry 912 controls transmission and reception of wireless signals. During a transmission mode, the control circuitry 912 provides a voice signal from microphone 922, or other data signal, to the transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

The control circuitry 912 can implement communications, as well as image processing and correlation algorithms, as discussed herein.

FIG. 9b depicts an example mobile device network. As mentioned, a mobile device may access one or more server to obtain information for configuring itself to control an electronic appliance. The mobile device 100 may communicate via a mobile device server 954 and a backend server such as a database server 952 via a network 950. The mobile device server 954 is responsible for handling communications to and from the mobile device, while the database server 952 can store information for configuring the mobile device. For example, control information received from an electronic appliance by the mobile device 100 can be forwarded to a database server 952 to obtain information regarding user interface settings and a communication protocol for use with the electronic appliance. This data can alternatively or additionally be stored at the mobile device 100.

Figure 10:
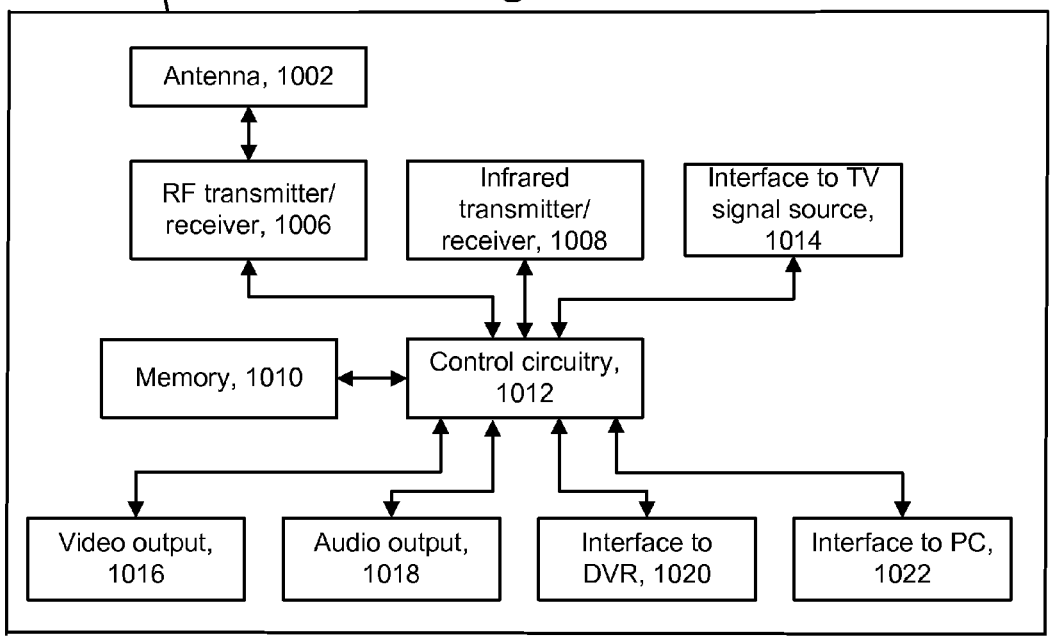
FIG. 10 depicts an example block diagram of a television.

FIG. 10 depicts an example block diagram of a television. The circuitry 1000 includes control circuitry 1012 that can include one or more microprocessors, and memory 1010 (e.g., non-volatile memory such as ROM and volatile memory such as RAM) which stores processor-readable code which is executed by one or more processors of the control circuitry 1012 to implement the functionality described herein. The control circuitry 1012 also communicates with RF transmit/receive circuitry 1006 which in turn is coupled to an antenna 1002, such as to receive RF signals from, and send RF signals to, a mobile device, or other component in a WLAN. An infrared transmitted/receiver 1008 may similarly be used for transmitting signals to, or receiving signals from, a mobile device. An interface to a TV signal source 1014 may receive broadcast video content from a terrestrial television antenna, a cable broadcast system, a satellite transmitter, and an Ethernet broadcast system, which is a bundled service combining Internet, telephone, and television services using Ethernet Internet Protocol (IP) broadcast packets sent to a user's home over fiber, copper twisted pair or coax. A video output 1016 can include a display device (e.g., display device 104 of television 105 in FIG. 1b). An audio output 1018, an interface to a digital video recorder (DVR) 1020 and an interface to a PC 1022 may also be provided.

The control circuitry 1012 can implement communications and image processing as discussed herein.

Figure 11:
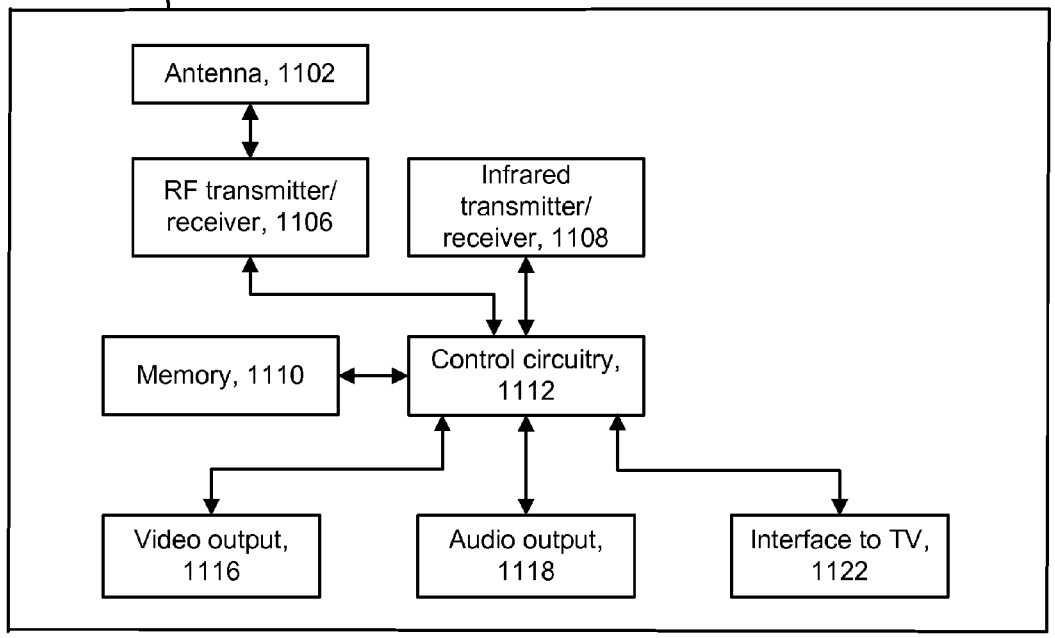
FIG. 11 depicts an example block diagram of a personal computer (PC).

FIG. 11 depicts an example block diagram of a personal computer (PC). The circuitry 1100 includes control circuitry 1112 that can include one or more microprocessors, and memory 1110 (e.g., non-volatile memory such as ROM and volatile memory such as RAM) which stores processor-readable code which is executed by one or more processors of the control circuitry 1112 to implement the functionality described herein. The control circuitry 1112 also communicates with RF transmit/receive circuitry 1106 which in turn is coupled to an antenna 1102, such as to receive RF signals from, and send RF signals to, a mobile device, or other component in a WLAN. An infrared transmitted/receiver 1108 may similarly be used for transmitting signals to, or receiving signals from, a mobile device. A video output 1116 can include a display device (e.g., display device 111 of monitor 110 in FIG. 1b). An audio output 1118 and an interface to a TV 1122 may also be provided.

The control circuitry 1112 can implement communications and image processing as discussed herein.

Figure 12:
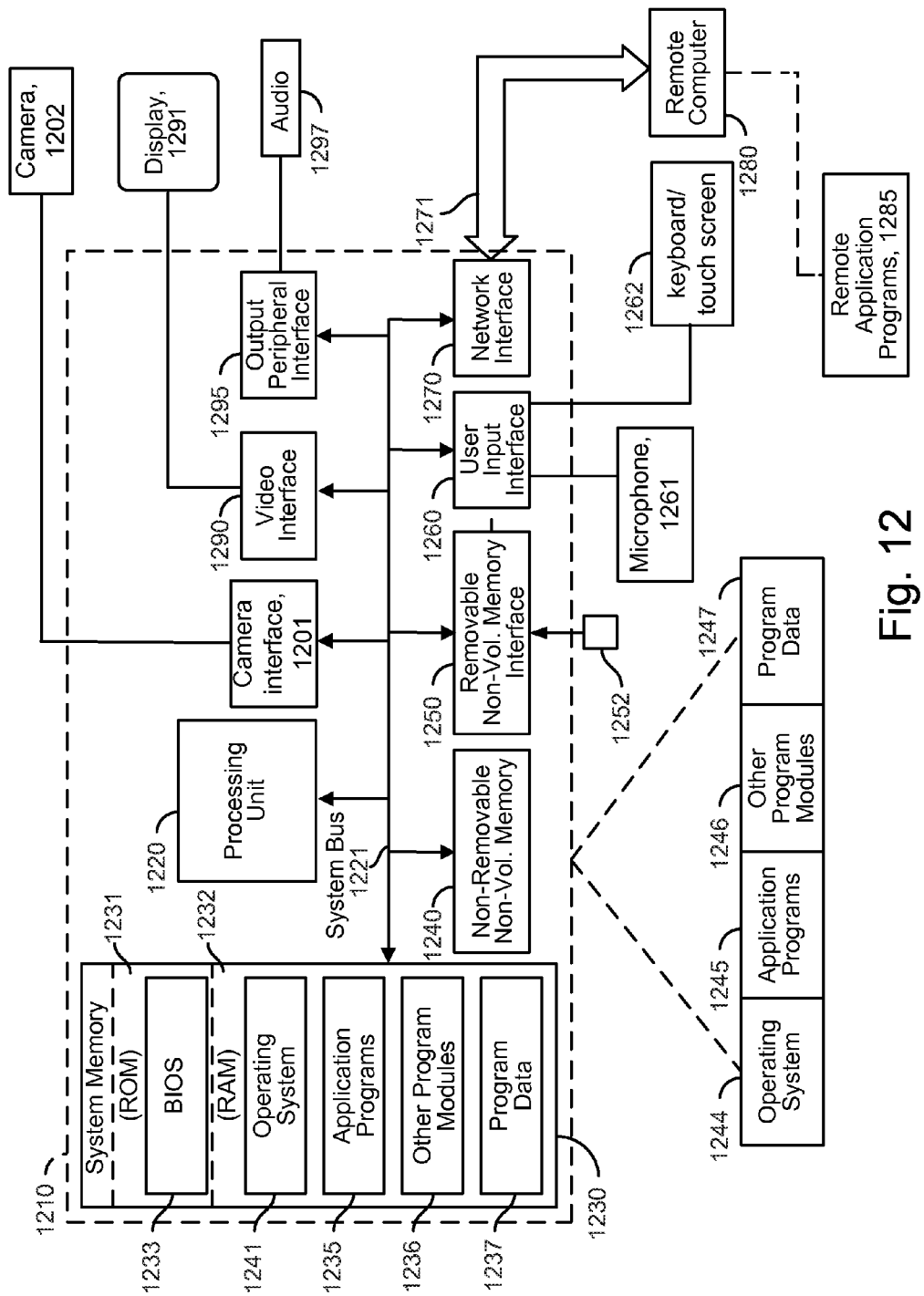
FIG. 12 depicts an example block diagram of computer hardware suitable for implementing various embodiments.

FIG. 12 depicts an example block diagram of computer hardware suitable for implementing various embodiments. The computer hardware can represent the mobile device of FIG. 4, for instance. An exemplary system for implementing various embodiments includes a general purpose computing device 1210. Components of computing device 1210 may include a processing unit 1220, a system memory 1230, and a system bus 1221 that couples various system components including the system memory to the processing unit 1220. The system bus 1221 may be, e.g., a memory bus or memory controller, a peripheral bus, and a local bus using any of a variety of bus architectures.

Computing device 1210 can include a variety of computer- or processor-readable media. Computer readable media can be any available media that can be accessed by computing device 1210 and includes both volatile and nonvolatile media, removable and non-removable media. Computer readable media may comprise computer storage media such as volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1210. Combinations of any of the above are also included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computing device 1210, such as during start-up, is typically stored in ROM 1231. RAM 1232 typically contains data and/or program modules that are immediately accessible to and/or presently being operated on by processing unit 1220. For example, an operating system 1234, application programs 1235, other program modules 1236, and program data 1237 may be provided.

The computing device 1210 may also include other removable/non-removable, volatile/nonvolatile computer storage media. By way of example only, FIG. 12 illustrates a non-removable, nonvolatile memory 1240 such as solid state memory, and a memory card (e.g., SD card) interface/reader 1250 that reads from or writes to a removable, nonvolatile memory card 1252. Other removable/non-removable, volatile/nonvolatile computer storage media that can be used in the exemplary operating environment include, but are not limited to, flash memory cards, digital versatile disks, digital video tape, solid state RAM, solid state ROM, and the like.

The computer storage media provide storage of computer readable instructions, data structures, program modules and other data for the computing device 1210. For example, non-removable, nonvolatile memory 1240 is illustrated as storing operating system 1244, application programs 1245, other program modules 1246, and program data 1247. These components can either be the same as or different from operating system 1234, application programs 1235, other program modules 1236, and program data 1237 in the system memory 1230. Operating system 1244, application programs 1245, other program modules 1246, and program data 1247 are given different numbers here to illustrate that, at a minimum, they are different copies. A user may enter commands and information into the computing device 1210 through input devices such as a keyboard/touch screen 1262 and microphone 1261. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A display/monitor 1291 is also connected to the system bus 1221 via an interface, such as a video interface 1290. A camera/light sensor 1202 is connected to the system bus 1221 via an interface 1201. Other peripheral output devices such as an audio output 1297 may be connected through an output peripheral interface 1295.

The computing device 1210 may operate in a networked environment using logical connections to one or more remote computing devices, such as a remote computing device 1280. The remote computing device 1280 may be another mobile device, a personal computer, a server, a router, a network PC, a peer device or other common network node, and typically includes many or all of the elements described above relative to the computing device 1210. Such networking environments are commonplace in offices, enterprise-wide computer networks, intranets and the Internet.

When used in a networking environment, the computing device 1210 is connected to another network through a network interface or adapter 1270. In a networked environment, program modules depicted relative to the computing device 1210, or portions thereof, may be stored in the remote memory storage device. For example, remote application programs 1285 can reside on memory device 1281. The network connections shown are exemplary and other means of establishing a communications link between the computing devices may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A processor-implemented method for configuring a mobile device which communicates by wireless signals, comprising:
    activating the mobile device to transmit a wireless signal, the wireless signal is received by a first electronic appliance comprising a first display device, the first electronic appliance transmits a wireless signal in response to receipt of the wireless signal from the mobile device, the wireless signal transmitted by the first electronic appliance comprises first image data corresponding to an image displayed on the first display device and information for controlling the first electronic appliance;
    receiving the wireless signal transmitted by the first electronic appliance at the mobile device;
    capturing the image displayed on the first display device using an image sensor of the mobile device;
    providing reference image data based on the captured image displayed on the first display device;
    determining if the first image data matches the reference image data; and
    based on whether the first image data matches the reference image data, deciding whether to configure a user interface of the mobile device to remotely control the first electronic appliance using the information for controlling the first electronic appliance.

2. The processor-implemented method of claim 1, wherein:
    the image displayed on the first display device comprises a predefined image which is readily detectable by the image sensor of the mobile device, and is displayed responsive to receipt of the wireless signal from the mobile device by the at least the first electronic appliance.

3. The processor-implemented method of claim 1, wherein:
    the information for controlling the first electronic appliance comprises an identifier of a protocol for controlling the first electronic appliance, and the mobile device accesses information for implementing the protocol based on the identifier.

4. The processor-implemented method of claim 1, wherein:
    the first electronic appliance comprises a personal computer, and the information for controlling the first electronic appliance comprises an identifier of an application running on the personal computer.

5. The processor-implemented method of claim 1, wherein:
    the wireless signal from the mobile device is received by a second electronic appliance comprising a second display device, the second electronic appliance transmits a wireless signal in response to receipt of the wireless signal from the mobile device, the wireless signal transmitted by the second electronic appliance comprises second image data corresponding to an image displayed on the second display device, and information for controlling the second electronic appliance, the reference image data comprises the image displayed on the second display device, the method further comprising:
    receiving the wireless signal transmitted by the second electronic appliance at the mobile device;
    determining if the second image data matches the reference image data; and
    when the first image data matches the reference image data, and the second image data matches the reference image data, deciding whether to configure the user interface to: (a) remotely control the first electronic appliance based on the information for controlling the first electronic appliance or (b) to remotely control the second electronic appliance based on the information for controlling the second electronic appliance, by determining whether the first image data or second image data is a better match with the reference image data.

6. The processor-implemented method of claim 5, wherein:
    the determining whether the first image data or second image data is a better match with the reference image data comprises determining whether the first or second electronic appliance is more centrally located in an image which is represented by the reference image data.

* * * * *